(12) United States Patent
Kase et al.

(10) Patent No.: US 6,668,249 B1
(45) Date of Patent: Dec. 23, 2003

(54) AGENT SYSTEM AND INFORMATION PROCESSING METHOD FOR SUCH SYSTEM

(75) Inventors: Naoki Kase, Yokohama (JP); Masanori Hattori, Fuchu (JP); Kenta Cho, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/227,338

(22) Filed: Jan. 8, 1999

(30) Foreign Application Priority Data

Jan. 9, 1998 (JP) .......................... 10-003213

(51) Int. Cl.$^7$ .................................................. G06N 5/00
(52) U.S. Cl. ........................ 706/45; 345/474; 386/69; 714/38
(58) Field of Search ........................ 706/45; 714/38; 345/474; 386/69

(56) References Cited

U.S. PATENT DOCUMENTS

| | | | | |
|---|---|---|---|---|
| 5,905,856 A | * | 5/1999 | Ottensooser | 714/38 |
| 6,031,549 A | * | 2/2000 | Hayes-Roth | 345/474 |
| 6,314,410 B1 | * | 11/2001 | Tackett et al. | 706/11 |
| 6,359,622 B1 | * | 3/2002 | Hayes-Roth | 345/474 |
| 2002/0131764 A1 | * | 9/2002 | David et al. | 386/69 |

FOREIGN PATENT DOCUMENTS

JP 10-149287 2/1998

OTHER PUBLICATIONS

Ohsuga et al., PLANGENT: An Approach to Making Mobile Agents Intelligent, IEEE Internet Computing, Jul./Aug., 1997.

* cited by examiner

*Primary Examiner*—Wilbert L. Starks, Jr.
(74) *Attorney, Agent, or Firm*—Banner & Witcoff, Ltd.

(57) ABSTRACT

Disclosed is a technology relating to an agent system for generating an excellent plan. A script can be freely described by individually storing an action definition and the script without any limitation due to a language form of the action definition. Constructing as one of agent functions an update of knowledge using information acquired by execution, removes the necessity for the description of operations relating to an update in the plan. Diversification of contents of a re-planning enhances a flexibility of the operations by an agent. Furthermore, when the agent moves among nodes, both of the agent and the node decide reliabilities of nodes to and from which the agent moves, so that a safety of information processing is improved. By preserving information used for restoring the agent at the time of the move of the agent, the agent having interrupted its action due to trouble can resume the action.

21 Claims, 22 Drawing Sheets

AGENT SYSTEM AND INFORMATION PROCESSING METHOD FOR SUCH SYSTEM

This application claims priority to Japanese Application No. 10-3213, filed Jan. 9, 1998.

BACKGROUND OF THE INVENTION

1. Field of the Invention

The present invention relates to an improvement of a technology which processes information distributed on a network using an agent, more particularly to an improvement which enhances flexibility and safety of an operation of an agent.

2. Description of the Related Art

Agent System

With reference to technologies for processing information distributed on a computer network, an agent system has been heretofore familiar. An agent is a process unit concerning software, and operates autonomously in response to peripheral circumstances. The agent system is the one that performs processing such as information collections while moving on nodes configuring the network according to demand. Here, the node is a logical unit that configures the network. A plurality of nodes can exist on a single machine, or on a computer.

FIG. 15 is a functional block diagram showing an example of a configuration of an agent system, which has been proposed in Japanese Patent Application No. 7-176181 by the applicant of the present invention as an example of such agent system. The agent system shown in FIG. 15 connects a plurality of nodes 800 with a network 800N, and in FIG. 15, only two nodes are illustrated, in spite of the fact that a plurality of nodes can be practically provided in the agent system. Among the nodes 800N, the node used by the user for an agent generation is called a local node (800L), and the node to which the generated agent moves is called a remote node (800R).

In this agent system, each of the nodes 800 has input/output means 803 (L, R) which allows the user to perform an operation to generate the agent and receives the result of information processing by the agent. Agent management means 804 (L, R) of each node serves to generate an agent and erase an agent that fulfilled its duties. The means 804 (l, R) serves also to move the agent to the other nodes by transferring the information of the agent to other nodes and to accept an agent moved from other nodes. When the user wishes to perform some information processings using such agent system, he indicates the agent management means 804L in the local node 800L from the input/output means 804L to generate an agent.

The most fundamental example will be described below. The user gives a script from the input/output means 803L to the generated agent. The script is an action program of the agent. In the script, the action program concretely describes the contents indicating which node the agent moves to and what processing the agent performs. As a more concrete example of the script, for example, the contents are conceived, which expresses that the agent moves to the node A to transmit the copy of the file b to user's node, and then moves to the node B to transmit the copy of the file b to user's node, and so on. Interpretation execution means 802 (L, R) provided in each node executes such script to allow to the agent to act, thus realizing information processing to be objected.

In this case, agent information memory means 801(L, R) provided in each node stores information necessary for the agent. The information necessary for the agent is each variable (called a script variable) necessary for the interpretation execution of the script, information collected by the agent and files if necessary, in addition to the foregoing script. As instructions described in the script of the agent, there is a move instruction to move the agent to other nodes, as well as an instruction capable of being executed only one node. The interpretation execution means 802L sequentially executes the instructions of the script, and designates the node to which the agent moves when the agent is required to execute the move instruction, thereby making a request to the agent management means 804 for moving the agent.

In such agent system, when the user wishes to collect several files from the network, it is satisfactory that the user gives the action program to the agent and sends out onto the network. The agent which was sent out acts autonomously based on the presented script. For this reason, since it is unnecessary to keep communications between the user's node and the agent throughout, this agent system involves a merit that it exhibits a strong resistance to circuit troubles compared to conventional network functions such as "ftp" and "telnet".

Example Configuration Using Planning

For the agent system shown in FIG. 15, agent systems has been also familiar, which are capable of changing the script that is the action program of the agent depending on circumstances.

Specifically, networks have recently became large-scale and complicated, and, when particularly they become the open system network by connecting them with a wide area network like an internet, components of the network such as a file position come to change. However, in the foregoing agent system shown in FIG. 15, since a fixed script is given to the agent at the time when it is generated, the agent can not change its action depending on circumstances. Accordingly, to cope with such change flexibly, the applicant of the present invention filed the agent system which possesses a planning function as the technology that automatically changes the action of the agent without any human agency.

In this technology, the action program of the agent is called a plan, and generation of the plan is called a planning. This technology appropriately remakes the plan depending on circumstances, and copes with changes of components of the network. Noted that remaking of the planning in response to the changes of the components of the network is called a re-planning.

An example of a configuration of such agent system is shown in a functional block diagram of FIG. 16. In this technology, information used for the generation of the plan includes the information called "kowledge" and the action definition. The "knowledge" means an operation of the agent, particularly various kinds of information used for the planning. For example, the "knowledge" includes information relating to the components of the network, which, for example, indicates in which node files exist. In the example of the configuration of FIG. 16, the knowledge relating to the structure of the network is previously stored in the local information memory means 1L. When the structure of the network changes, the update means 2L reflects such change on the knowledge by an automatic detection, a manual operation or the like. Furthermore, the action definition means information indicating which kinds of instructions (action) can be used as parts for configuring the plan. The action definition is previously stored in the agent information memory means 3.

In such agent system, the user instructing the generation of the agent gives a goal to be achieved to the node, instead of the script. Here, the goal describes a situation to be achieved as an object of the information processing, according to a predetermined grammar. The plan generating means 5 combines various kinds of actions included in the action definition while referring to the presented knowledge, and generates the plan for achieving the goal. In such agent system, changes of the structure of the network is reflected on the plan of the agent through the knowledge at the time of the planning and the re-planning, so that the agent can cope with the change of circumstances without human agency and change its action flexibbly.

Noted that means for generating such plan is called also "planner", and its entity is a kind of program which expresses procedures of the planning. Furthermore, a wide sense concept naming the action program of the agent and each portion thereof is the script. The "plan" means the total of the script which was generated by the agent performing the planning shown in FIG. 16.

Subsequently, concrete operation procedures of the agent system using the foregoing planning are exemplified in FIG. 17. In these procedures, when the user inputs the description (demand description) which is demanded for the agent as a goal of the information processing (step 201), a necessary initialization is executed (step 202). Thereafter, the plan is generated (step 203). Noted that the processing is terminated according to the determination result relating to whether or not termination conditions such as an attainment to the goal was already achieved (steps 204 and 205).

Specifically, until such termination conditions are satisfied, the plan which requires the execution in order to achieve the goal is executed (step 204). In the execution of the plan, each instruction included in the plan is sequentially executed, and when an instruction to be executed is the move instruction, the processing to move the agent between nodes is executed (steps 206 to 208), which is called a "go" action. Moreover, when the execution of each instruction and the execution of the "go" action are unsuccessfully performed, a new plan is generated if necessary.

Here, in the action definition used for the generation of the plan, the preconditon and the ex post facto condition are defined every kind of the action (operation). The beforehand condition expresses the possibility of the agent's operation depending on what kinds of conditions are satisfied. The ex post facto condition expresses what kinds of conditions are produced with the execution of such agents operation. For example, in order to execute the operation expressed by the sentence "copy the file", the beforehand condition indicating "the file exists in the node where the agent exists" is necessary. As a result of the copying operation, the ex post facto condition indicating "the copying of the file exists" is produced.

The generation of the plan means the acquisition of operation string connecting between the situation before the execution of the plan (present situation) and the final goal by sequentially executing processings that an operation to produce the final goal as the ex post facto condition is found and then another operation to produce the beforehand condition of that operation as the ex post facto condition is found. Noted that FIG. 18 shows an example of the plan which is being generated. In this example, an operation to produce the beforehand condition C5 of the operation P2 and the beforehand condition C7 of the operation P3 as the ex post facto condition has not yet been found. As described above, a beforehand condition in which other operations to produce the beforehand condition as the postcondion has not yet been found is called a unachieved goal.

The processing of such plan is executed by going back to the cause from the goal, and terminated when the situation existing at the time of starting the plan execution (present situation) is attained. FIG. 19 is a flowchart of an example of the plan completed by such processings.

Subsequently, concrete procedures of the plan generation is shown in FIG. 20. Specifically, in these procedures a part of goal list which records the goal is set to the unachieved goal list which records the unachieved goal as shown in FIG. 18, and the following processing are executed. First, until the unachieved goal comes not to exist in the goal list (step 401), the unachieved goal is selected one by one from the unachieved goal list (step 402). Except the case where the goal is satisfied (step 403), the following operations are executed. Specifically, if an operation capable of, by the ex post facto condition, achieving the beforehand condition that is the goal exists (step 404), this operation is selected (step 405). The operation selected in such manners (selection operation) is added to the string of the operations (plan tree) shown in FIG. 19 (step 405).

Furthermore, when an operation capable of achieving the goal does not exist, it is determined whether or not the goal can be achieved by an uncertain knowledge. Here, the uncertain knowledge is the one the value of which can not be known as long as some processings are not executed in other nodes, among knowledge relating to the structure of the network. When the goal can be achieved by the uncertain knowledge, this uncertain knowledge is added to the plan tree as the selection operation (step 405). When the goal can not be achieved by the uncertain knowledge, the processing is made to backtrack (step 408), and the operation which is producing the present unachieved goal is replaced by another operation, so that the processing is executed again.

For example, based on the node knowledge for the node used by the user, it is assumed that "the file a exists in the node A". In this case, when the user gives the goal to acquire the file a to the agent, since the knowledge indicating that file a exists in the node A is referred to, the plan of the agent generated has the content that "the agent moves to the node A and transmits the copy of the file a to the node of the user".

However, if the file a is transmitted to the node B at the time the agent moves to the node A, the file a can not be found, so that the plan is executed unsuccessfully, thus the re-planning is executed on the node A. At this time, the node knowledge of the node B is updated in accordance with the move of the file. When the node knowledge is changed to "that file a exists in the node B", a new plan is changed to the content that "the agent moves to the node B and transmits the copy of the file a to the node of the user". As a result, the agent autonomously moves to the node B, and finds the file a well, so that the agent transmits it to the node of the user successfully.

Furthermore, procedures when the agent moves between nodes based on the plan generate in such manners are shown in FIG. 21. In this example, it is assumed that the agent moves from the local node where the user generates the agent to the remote node other than the local node. In this case, the move request is sent out from the local node (step 501) and the remote node accepts the move request (step 502) from the local node. The remote node which accepted the move request sets the process for the agent (step 503).

Subsequently, the remote node sends the notice indicating that the setting of the program has completed to the local node (step 504), and the local node accepts the notice from the remote node (step 505). The remote node transmits the agent information such as the plan of the agent and a variable area to the remote node (step 506). The remote node which accepted the agent information (step 507) store it (step 508), and transmits the notice of the successful move to the local node (step 509), and starts the interpretation execution of the plan (step 510). On the other hand, the local node accepts the notice of the successful move (step 511), and erases the process for the agent which became unnecessary (step 512).

Lifecycle of Agent

Next, the conception view illustrating the lifecycle of the agent which executes the planning as described above is shown in FIG. 22. Specifically, the agent is generated at the time of goal installation, and starts the action. First, the agent starts to act from the planning phase P where the plan is generated. According to the plan generated, the agent moves to the execute phase E for executing the plan and to the move phase M for moving between the nodes. Depending on the execution of the plan and failure of the move, the agent acts while moving between the nodes. If the goal initially presented is achieved, the procedure goes to a normal termination. If the goal can not be achieved and the agent fails in planing itself, the procedure is terminated because of complete failure.

Example Using Firm

Furthermore, an agent system in which several areas called a firm are provided on one node may be conceived. Here, the firm is an action area of the agent which set depending on the object and field of the information processing. The firm is also called a field. A plurality of such firms (fields) are allowed to exist in one node, and information used for generation and execution of resources such as a memory and a plan is provided every firm (field).

FIG. 23 is a concept view illustrating an example in which a plurality of hosts H (machines) are connected to the network N, one node X exists on each host H, and a plurality of fields FL exist on the node X. In such agent system, the knowledge used for the generation of the plan is separated for each firm (field FL). Therefore, when the agent retrieves information necessary for the planning, it is unnecessary to refer to excessive information, so that information processing is executed with a high efficiency. Noted that the knowledge used for the generation of the plan can be classified into a firm knowledge possessed by the firm, an agent knowledge possessed by the agent and the like, depending on an entity which possesses the knowledge.

However, the foregoing conventional technologies involve the following problems.

(1) First, the agent system generates the plan with reference to the action definition. The conventional action definition includes an action name, a beforehand condition, an action string and an ex post facto condition, which is expressed in the form of the following description.

action (action, name,
   (beforehand condition),
   (action string),
   (ex-post facto condition)).

In the conventional action definition, when the action is executed in the plan, what kinds of operations are executed was concretely described in the items of the foregoing action string. For example, in the following conventional action definition, action  (checkNode,
   ( target(Node),
     nodeName(OriginNode)),
   ( goto(Node),
     get('inform.dat'),
     goto(OriginNode),
     put('inform.dat')),
   ( checkedNode(Node)).

Concrete procedures corresponding to the action name that is "checked Node" is described in the underline portion. Here, the portions other than the action string are information used for the generation of the plan. The action string is information used when the plan is executed.

As described above, the information used for the generation of the plan and the information used for executions mixedly existed in the action definition until now, the script was restricted to a language form of the action definition, and its description can not be done freely. Noted that here the script means the description of concrete operations configuring the plan. Particularly, the action definition was a language form for mentioning information concerning to necessary items, and is unsuitable for the description of operation procedures having a complex control structure. Moreover, since the information used for the generation of the plan and the information used for the execution mixedly existed, while involving unclear distinction of both information is unclear, operations to make them and to correct them were troublesome.

(2) Furthermore, the agent system operates while iterating the cycle that the planning is executed with referencing to the knowledge and then the plan is executed. The information acquired by the execution of the plan should be reflected on knowledge used for succeeding planning. In order to add the existing information by the information acquired by the execution of the plan and update the existing information, it was necessary to concretely describe the operations in the plan.

However, the plan itself that is an object of the execution, the knowledge used for the generation of the plan and the instruction for updating the knowledge have different purposes from each other. Since plural information having the different purposes mixedly existed in the plan, the information can not be separated, so that works to construct the operation (application) of the agent in accordance with the description and object of the operation has been troublesome and complicated.

(3) Furthermore, the agent system performs the re-planning if necessary. However, there has been no way other than the following two ways. One was that when the re-planning is performed and how the re-planning is performed are concretely described. And, the other is that the re-planning is exclusively entrusted to a standard (default) on the system. For this reason, the operation lacked flexibility, and it was difficult for the agent to flexibly cope with various kinds of circumstances.

(4) Another problem in the conventional technologies described above is the one concerning security of the information. Specifically, the agent having moved may access illegally to various kinds of resources such as data files possessed by the node and the firm. The agent may also destroy and correct erroneously them. On the contrary, the node and the firm may access illegally to the internal data of the agent, or may destroy and erroneously correct it. For this reason, an agent system of a high safety having a security function was called for.

In addition, when the node and the firm do not fit up the knowledge base for the planning, the correct planning for achieving the object of the agent can not be necessarily generated on the node and the firm. Furthermore, the case where the execution of the plan is permitted and the planning is not permitted from view-point of circumstances such as limitations to security and resources may be conceived, depending on the node and the firm. In such case, it is necessary to execute the planning only on an appropriate node, and a technology concerning such control is required.

(5) Furthermore, since the agent continues to act while sequentially moving between the nodes on the network, when troubles such as a host down happen to occur in the node where the agent continues to act, also the action of the agent is interrupted. In such case, since the information of the agent extinguishes at the time of the occurrence of the trouble, it was impossible to continue the operation of the agent though the node could be resumed.

Furthermore, the user had no means having such functions to generate an agent in the node used by the user, verify a present position of the agent after sending out the agent, and verify whether or not the agent continues to act without troubles. For this reason, there has been a problem that the-operation is delayed by waiting the return of the agent in spite of the extinction of the agent due to the occurrence of the trouble on the node. On the contrary, in spite of no extinction of the agent, because of a little delay of the return of the agent it is misunderstood that the agent extinguished due to some troubles. There has been a problem that the agent is sent out again, resulting in doubled labor.

Furthermore, also in the case where it is estimated that the agent extinguishes due to trouble of the node, there has been no means for resuming the operation of the agent. Therefore, it is required to regenerate the agent and the agent must resume its action from the beginning, and hence a duty of the network resource increases and the procedure is troublesome.

SUMMARY OF THE INVENTION

The present invention has been proposed to solve the foregoing problems of the conventional technologies, and the object of the present invention is to provide a technology of an agent for generating an excellent plan. Moreover, another object of the present invention is to provide atechnology of an agent having an excellent reliability.

More concretely, the objects of the present invention are as follows.

(1) Capability of freely describing a script without any limitation due to a language form of an action definition.
(2) Removing of necessity for describing in the plan an update of information obtained throughout the execution.
(3) Enhancement of flexibility of agent operations by diversifying contents of the replanning.
(4) Improvement of safety of information processing.
(5) Allowing an agent to resume its action when the agent has interrupted the action due to node trouble.

The above described objects have been achieved by the present invention. According to one aspect of the present invention, there is provided an agent system in which an agent processes information based on a plan. The agent system comprises storing means for storing an action definition indicating what action can be used for the plan, and a script entity concretely describing what operation the action executes, separately from each other. In this system, since a script entity is separated from an action definition, the script can be freely described, for example, using a control structure such as a conditional branch, due to a language form and a grammar structure used for the description of the action definition.

According to another aspect of the present invention, there is provided an agent system in which an agent processes information while moving among a plurality of areas on a network. The agent system comprises; management means for managing said agent and each of said areas; and first information indicating whether or not each of said areas on the network is reliable, wherein said management means for managing said agent decides a reliability of an area to which the agent intends to move based on said first information, and allows the agent only to move to a reliable area, when the agent intends to move among said areas; and said management means for managing each of said areas decides a reliability of an area from which the agent intends to move based on said first information, and accepts only the agent moving from a reliable area, when the agent intends to move to the area from another area. In this system, each area accepts an agent only from a reliable area, and the agent moves only to a reliable area. For this reason, both of the agent and the area can reduce the risk of infringements by illegal accesses from each other.

According to another aspect of the present invention, there is provided an agent system in which an agent processes information while moving among a plurality of nodes on a network. In the agent system, each node comprises: means for preserving at least one of information for restoring the agent before a move and information for restoring the agent after the move when the agent moves among the nodes; and means for restoring the agent using the preserved information when the agent has disappeared due to trouble. In this system, when the agent has disappeared due to trouble of the nodes, the agent is regenerated and restored from the preserved information, automatically or by a request of a user, whereby the processing is resumed. Therefore, the agent can continue its action from the state slightly before the agent has disappeared. It is unnecessary for the user to generate the agent from the beginning again as wellas for the agent to execute the processing from the beginning again.

BRIEF DESCRIPTION OF THE DRAWINGS

For a more complete understanding of the present invention and the advantages thereof, reference is now made to the following description taken in conjunction with the accompanying drawings, in which.

DESCRIPTION OF THE PREFERRED EMBODIMENTS

Preferred embodiments of the present invention will be described with reference to the accompanying drawings below.

It should be noted that it is considered that the present invention is generally realized by controlling a computer having peripheral equipment with software. In this case, an input unit such as keyboard and mouse can be input information and an output unit such as CRT display unit and printer can be output information. Furthermore, a memory unit such as register, memory and external memory unit can store information temporarily or permanently in the various kinds of forms. A CPU can make various processes such as manipulation and decision for such in formation according to the foregoing software, and control the order of the processes.

The software for controlling the computer is prepared by combining instructions corresponding to the processes of the present invention described in the claims and the specification. The prepared software is executed by a processing system such as compiler and interpreter, resulting in utilizing of such hardware resources as described above.

Noted that embodiments to realize the present invention can be modified in a variety of forms. For input/output of the information between the unit of the present invention and an external unit, other means also may be used and the means includes, for example, a recording medium such as floppy-disc which is detachable from the unit, and a network connection unit. Furthermore, a recording medium such as CD-ROM is an embodiment of the present invention by itself alone if the software for realizing the present invention has been recorded on the recording medium. Still furthermore, a part of the function of the present invention can be realized with a physical electronic circuit such as LSI.

As described above, since embodiments to realize the present invention using a computer can be modified, embodiments of the present invention will be described using a virtual circuit block adapted to realize each function of the present invention.

1. First Embodiment

Separation of Scrip from Action Definition

The first embodiment corresponds to the claims 1 to 5. In an agent system in which an agent processes information based on a plan, an action definition and each script entity are separately stored. The action definition describes what actions can be used for the plan. The script entity concretely describes what operation the action performs.

1-1. Structure

Figure 1:
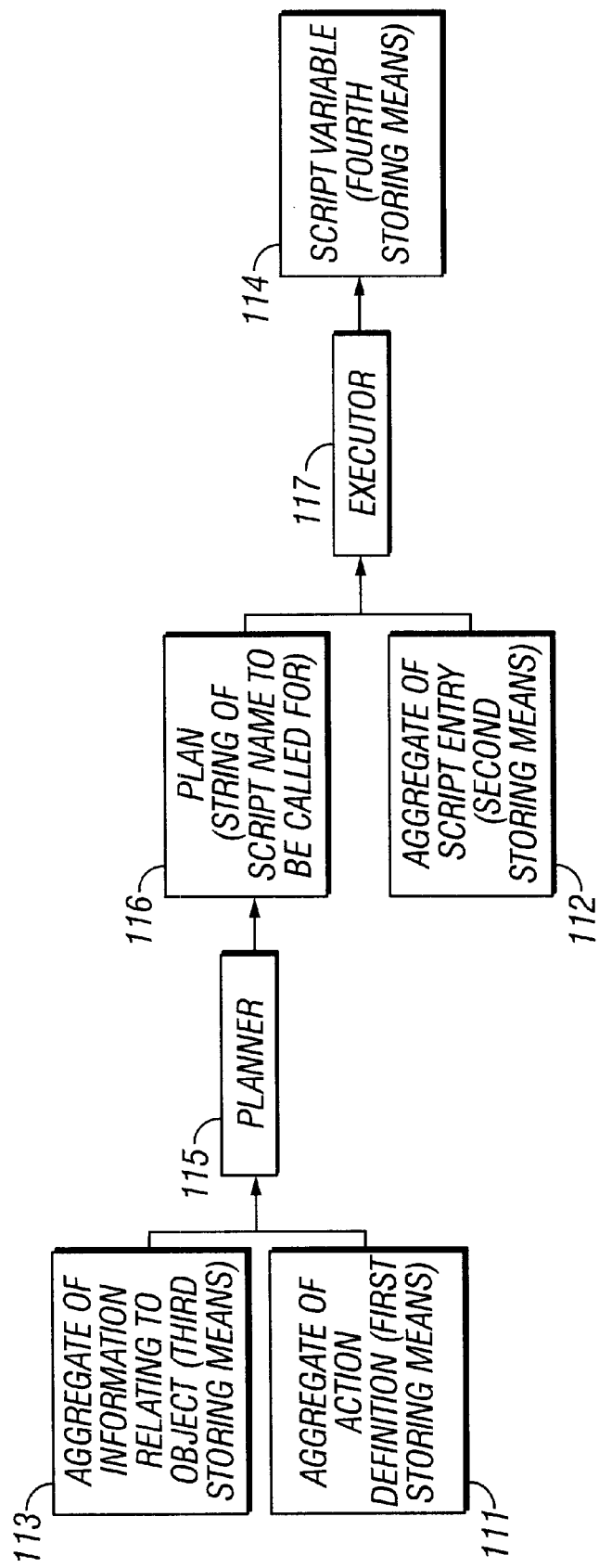
FIG. 1 is a functional block diagram showing a structure of a node in a first embodiment of the present invention.
Figure 15:
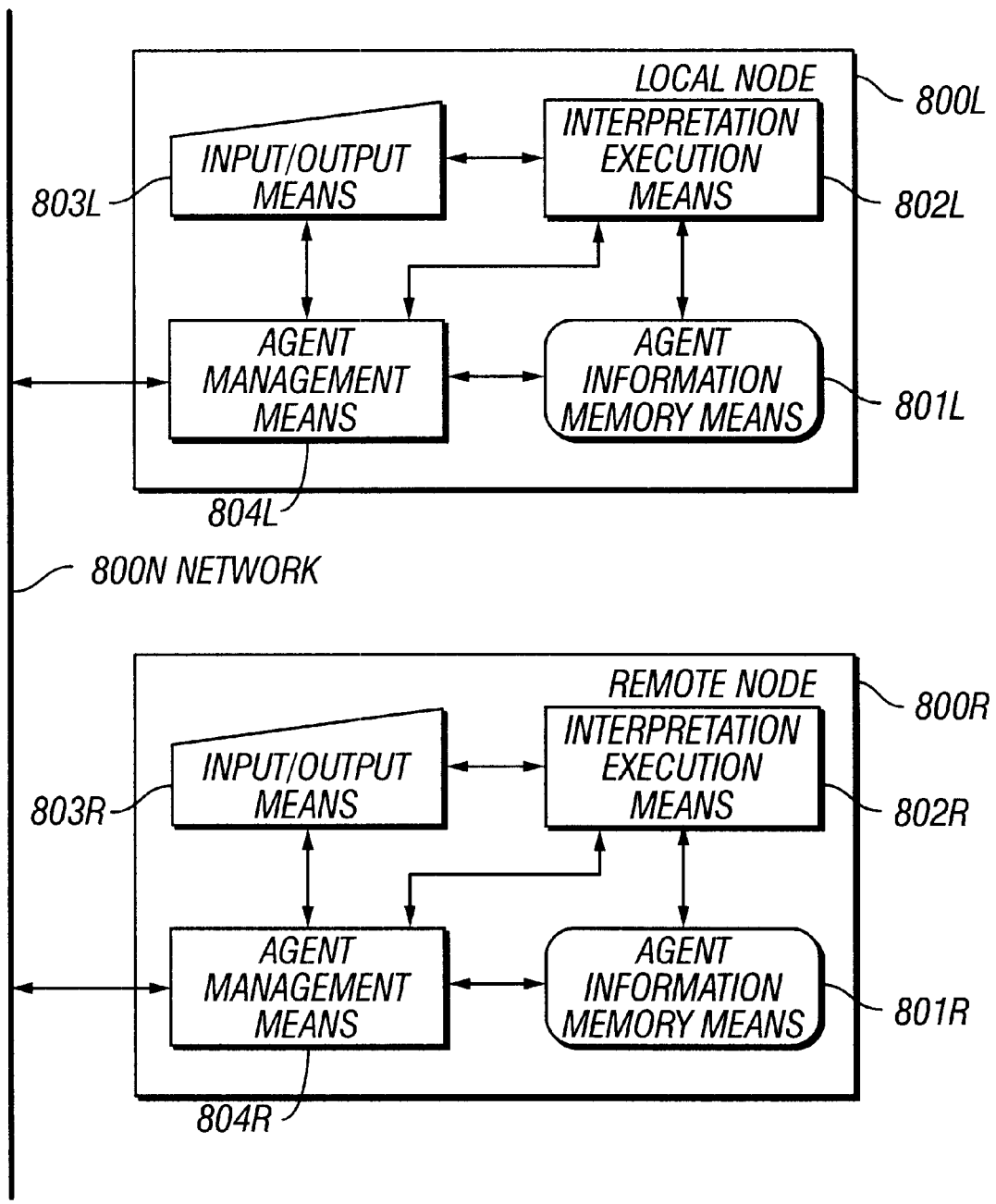
FIG. 15 is a flowchart showing a configuration example of a conventional agent system.
Figure 16:
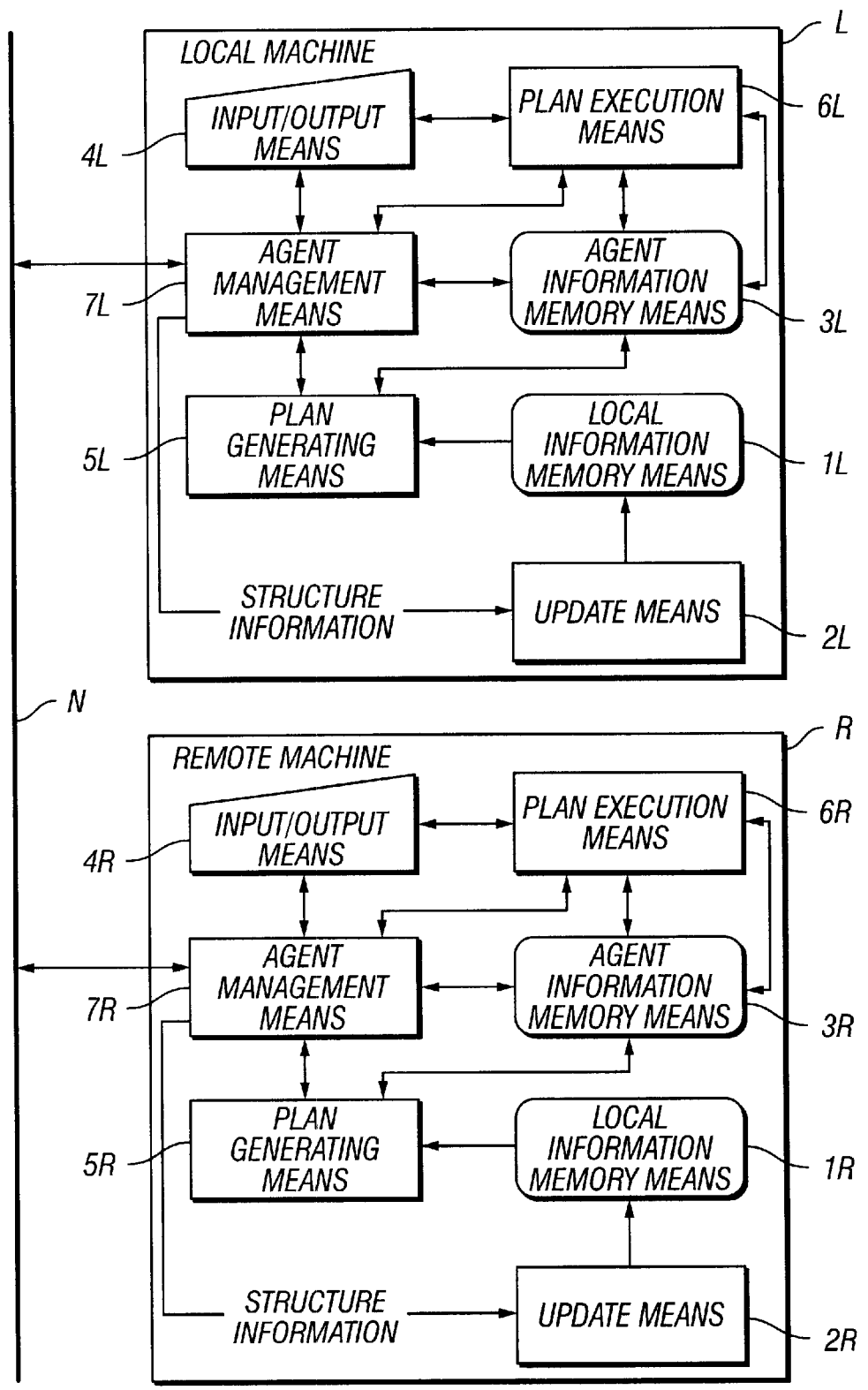
FIG. 16 is a flowchart showing a configuration example of a conventional agent system in which a planning is executed.
Figure 17:
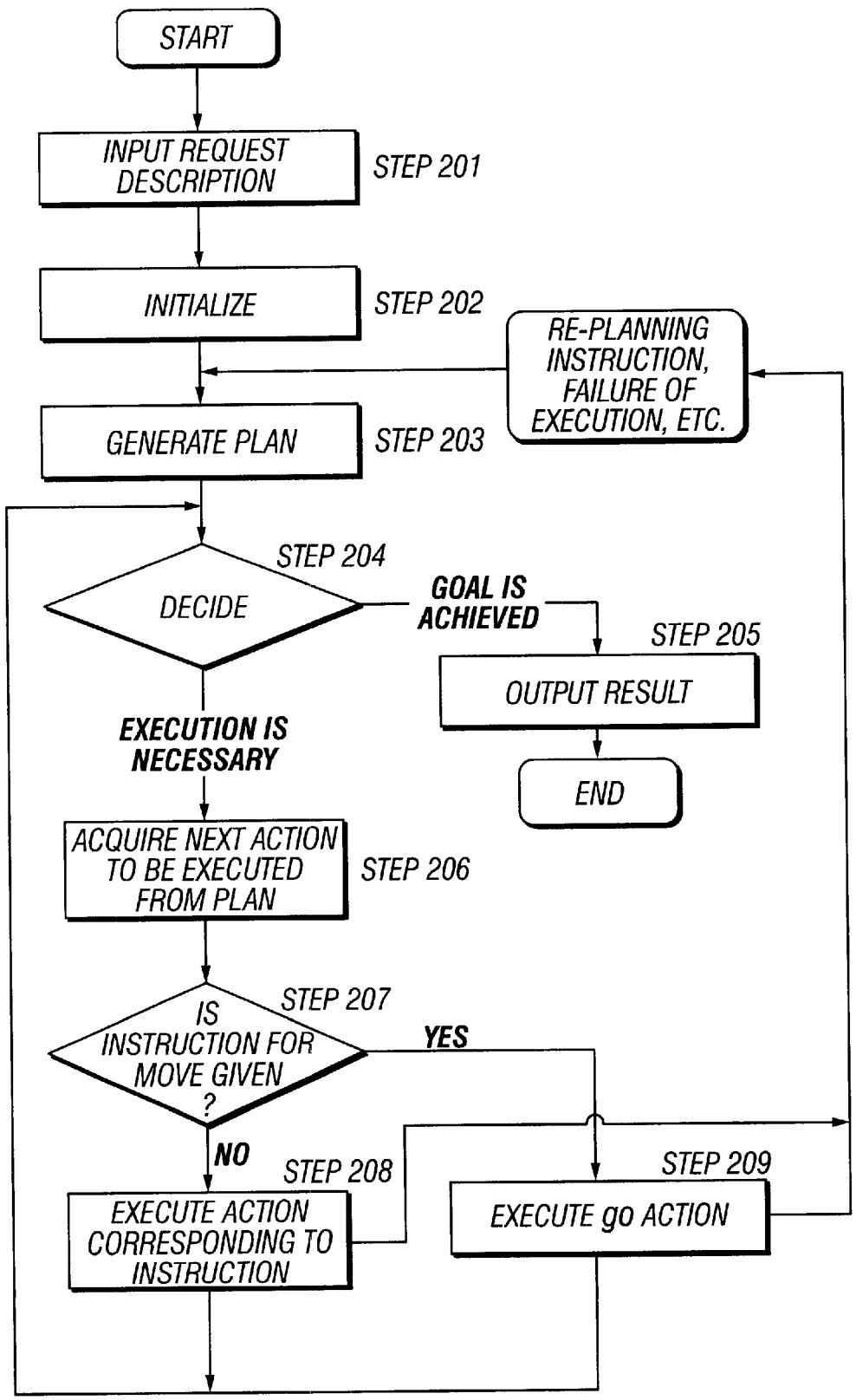
FIG. 17 is a flowchart showing a procedure in the conventional agent system.

FIG. 1 is a functional block diagram showing a structure of each node in the agent system of the first embodiment. In the agent system of the first embodiment, similarly to the conventional technologies shown in FIGS. 15 and 16, a plurality of nodes are connected through a network, and input/output means and means for managing an agent and making the agent move between the nodes are provided in addition to components shown in FIG. 1. Noted that these components are not illustrated in FIG. 1.

In such first embodiment, each node has first storing means 111 and a second storing means 112. Of these, the first storing means 111 stores an action definition indicating what actions can be used for a plan. A second storing means 112 stores a script entity concretely describing what operation each action performs. Furthermore, in the action definition of each action, a script name that designates the foregoing script entity corresponding to each action is described.

Furthermore, each node has third storing means 113 for storing a set of information relating to an object of information processing. The set of the information includes, for example, a file name and which node keeps the file. The information stored in the third storing means 113 is so called knowledge which expresses information relating to components of a network, and referred to at the time a plan is generated.

Each node has a planner 115 and an executor 117. The planner 115 is means for generating a plan 116 of an agent by combining script names described in the action definition which is stored in the first storing means 111. The executor 117 is means for sequentially reading out from the second storing means 112 the script entity corresponding to the script name which is included in the generated plan 116 and executing the plan, thus realizing operations of the agent. Each node has fourth storing means 114 for storing a script variable used when the plan 116 is executed.

1-2. Operation

In the foregoing first embodiment, in the action definition for each action, not only an action name, a beforehand condition, an ex post facto condition, but also a name of a script (a script name) corresponding to the action, are described in the following style.

action (action name,
    (beforehand condition),
    (script name to be called for),
    (ex post facto condition))

At this time, parameters to be delivered to the corresponding script entity are described in the script name. The action definition described in such way is previously stored in the first storing means 111.

Furthermore, a concrete script of the operation performed in each action, which is called a script entity, is prepared separately from the action definition, and the script entity is named by the same script name as that used for the action definition of its action. This script entity is previously stored in the second storing means 112.

For example, in the action definition which is expressed by action(checkNode,
    (target (Node),
    nodeName(OriginNode)),
    (get_infor(Node, 'inform.dat', OriginNode),
    (checkedNode(Node))).

As described with under line, the script name:
    get_info(Node, 'inform. Dat', OriginNode)
is previously described in the action difinition. Then, the concrete script entity corresponding to this script name is previously described in the following script description:

```
get_info( $node, $filename, $origin)
{
    goto( $node);
    if( -exist $filename) {
        get( $filename);
        goto( $origin);
        put( $filename);
    } else {
        report("File Not Found:", $filename);
    }
}
```

At this time, since the description of the script entity is separated from the action definition, the script can be freely described using a control structure such as if then, without any limitation due to a language form of the action definition.

Figure 2:
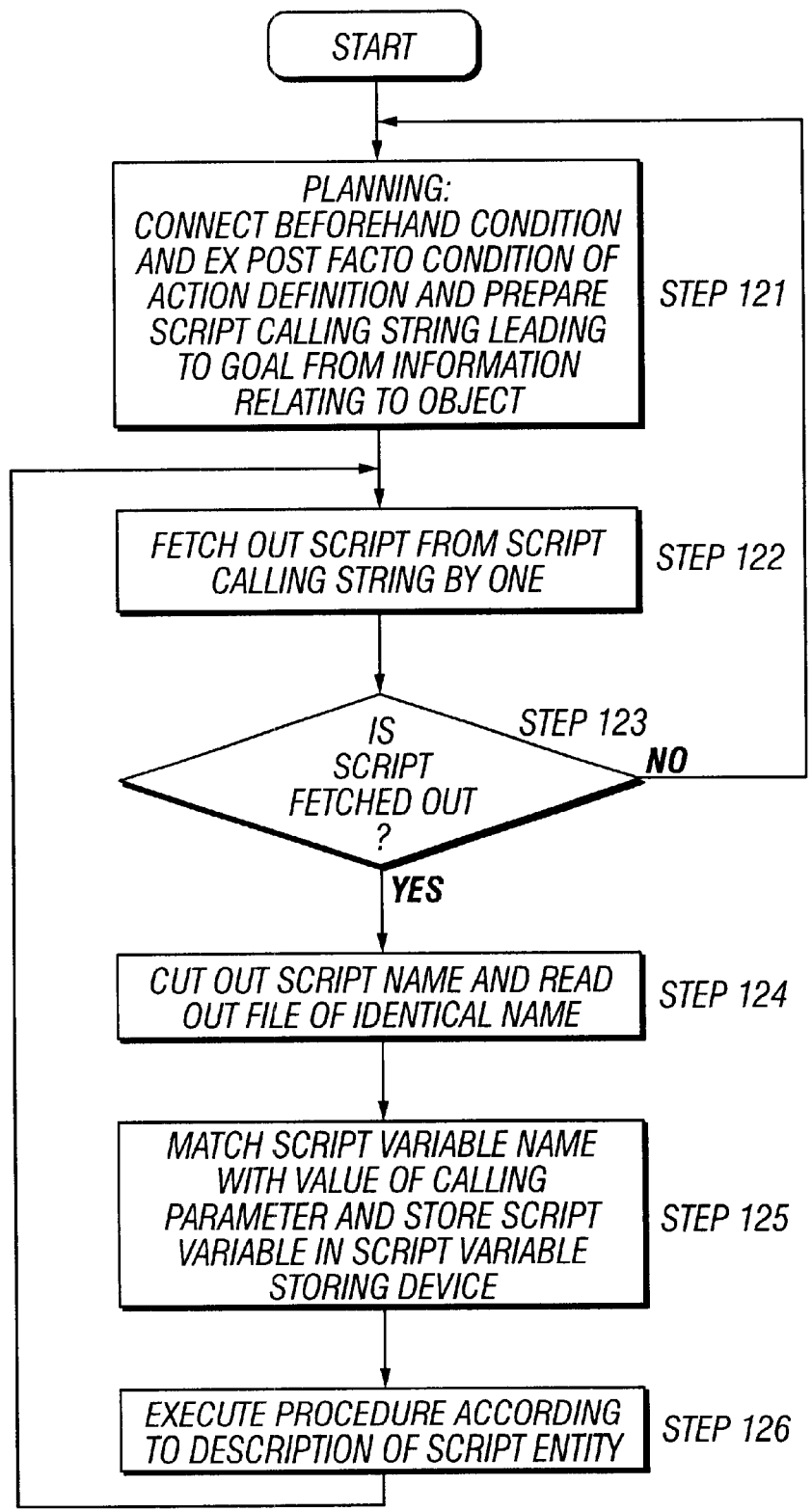
FIG. 2 is a flowchart showing a procedure of executing a planning and a plan in the first embodiment of the present invention.

Next, based on the action definition and the script entity prepared in the above described manners, the procedures for generating and executing the plan are shown in the flowchart of FIG. 2.

1-2-2. Generation of Plan

Figure 18:
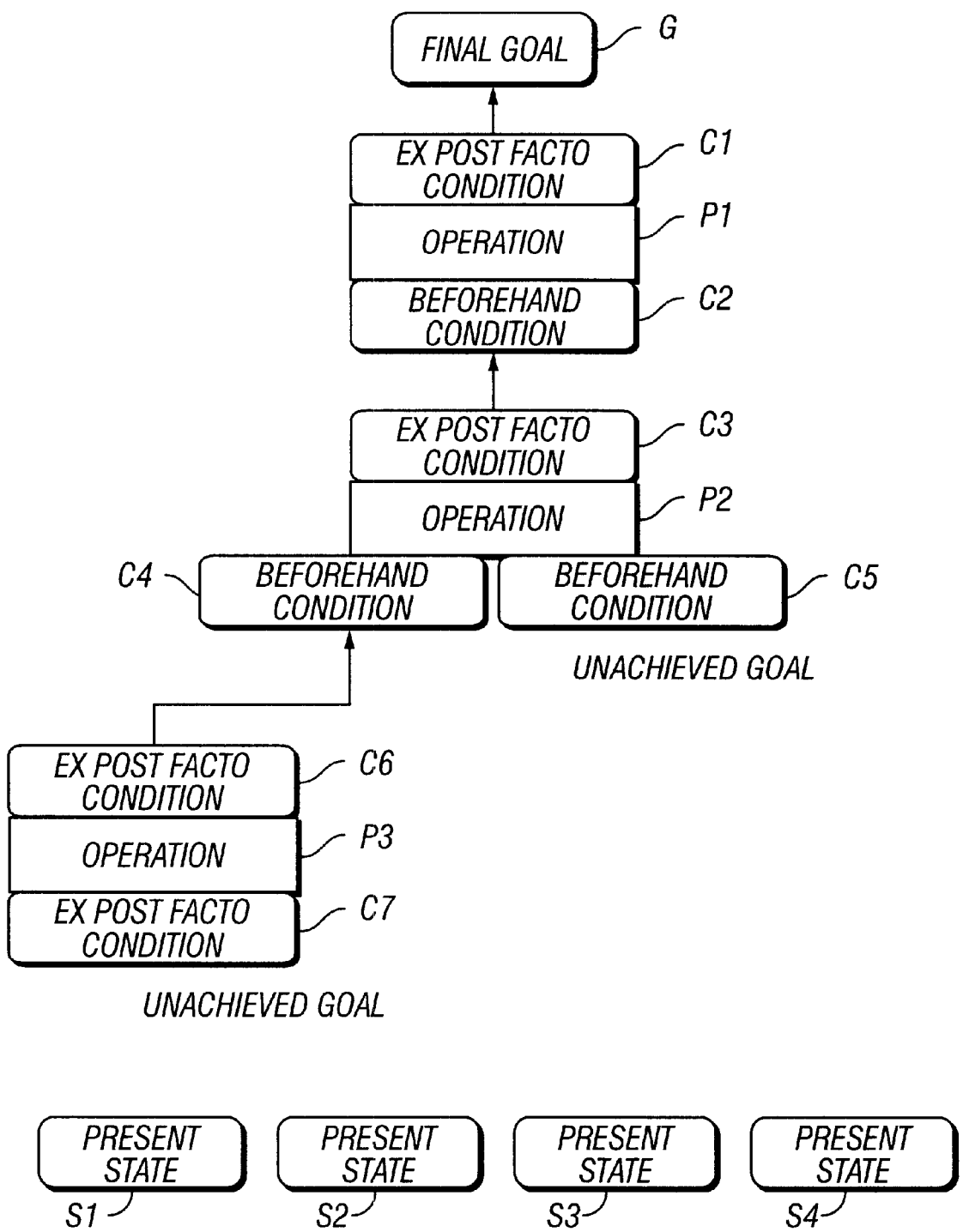
FIG. 18 is a conceptual view showing an example of a plan that is being generated in the conventional agent system.
Figure 19:
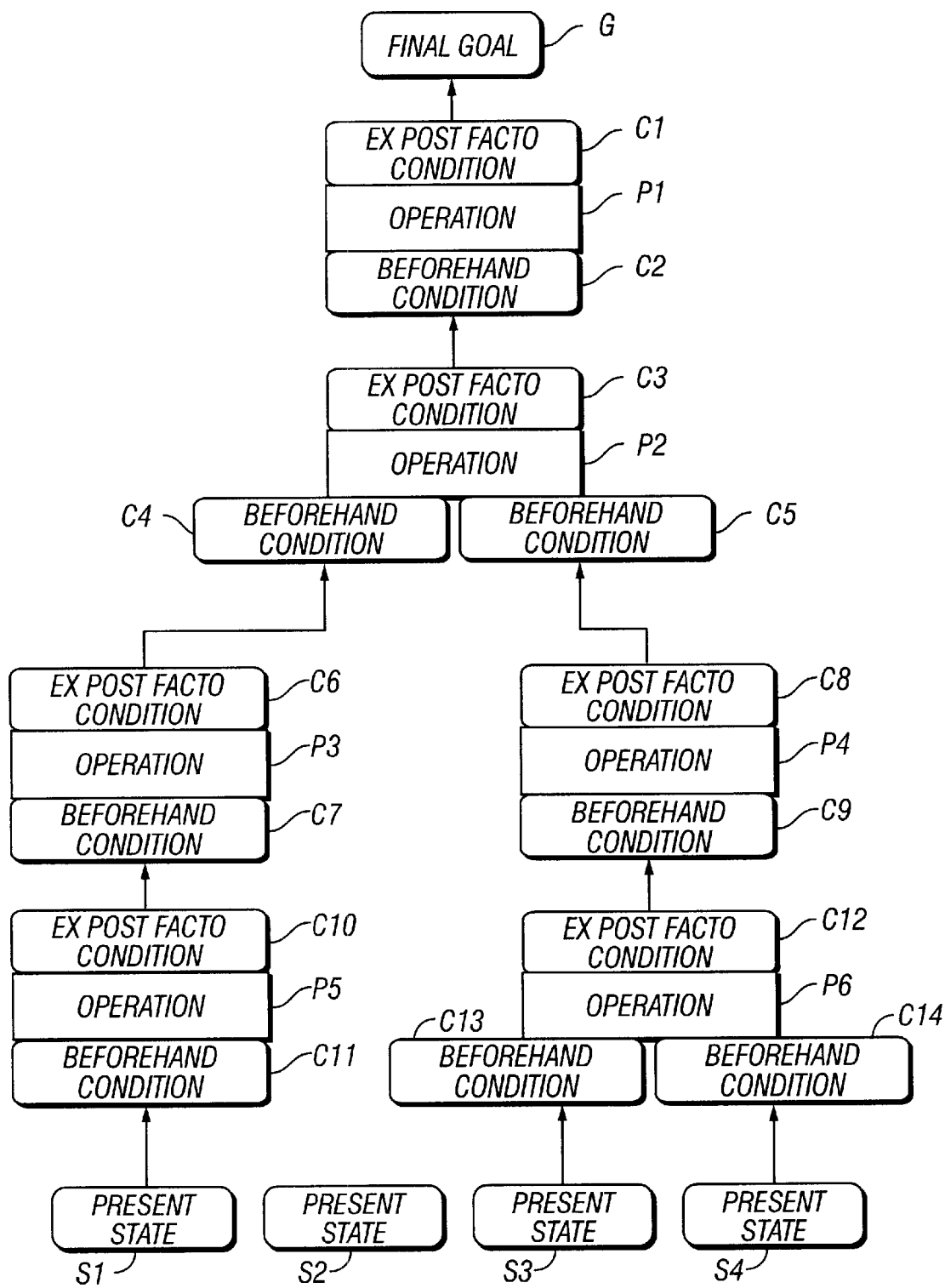
FIG. 19 is a conceptual view showing an example of a completed plan in the conventional agent system.
Figure 20:
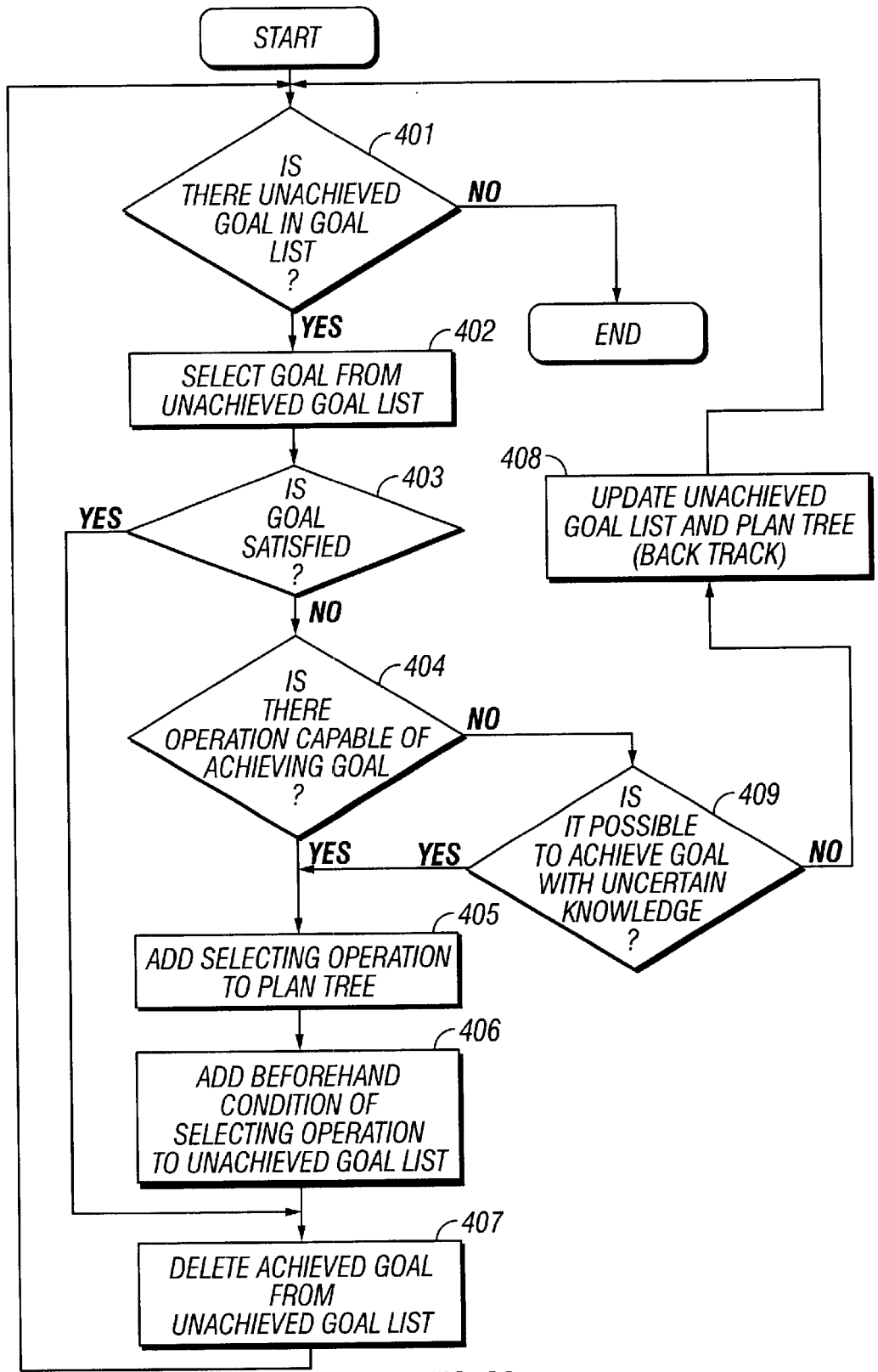
FIG. 20 is a flowchart showing a procedure of a planning in the conventional agent system.
Figure 21:
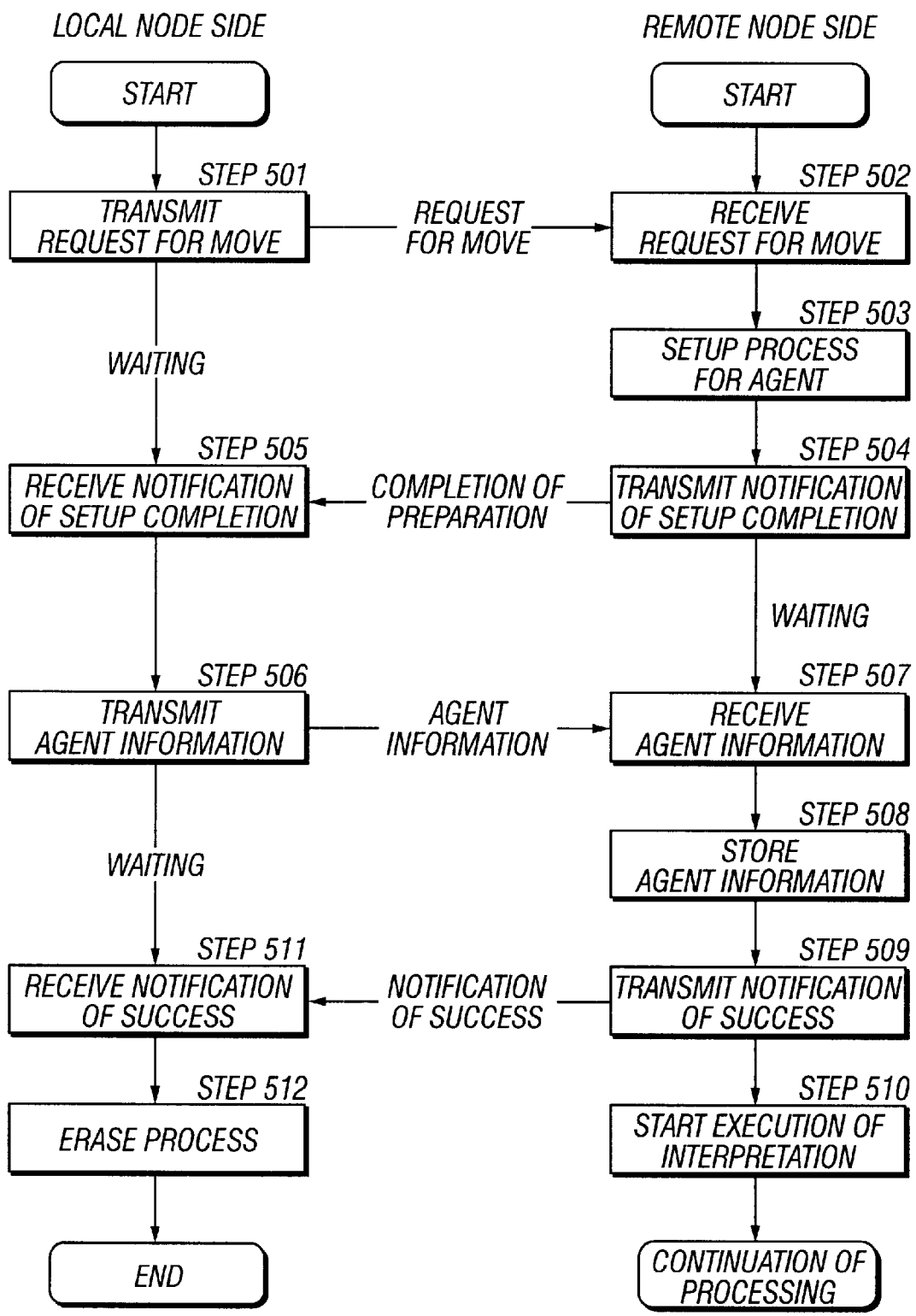
FIG. 21 is a flowchart showing a procedure in which an agent moves between nodes in the conventional agent system.
Figure 22:
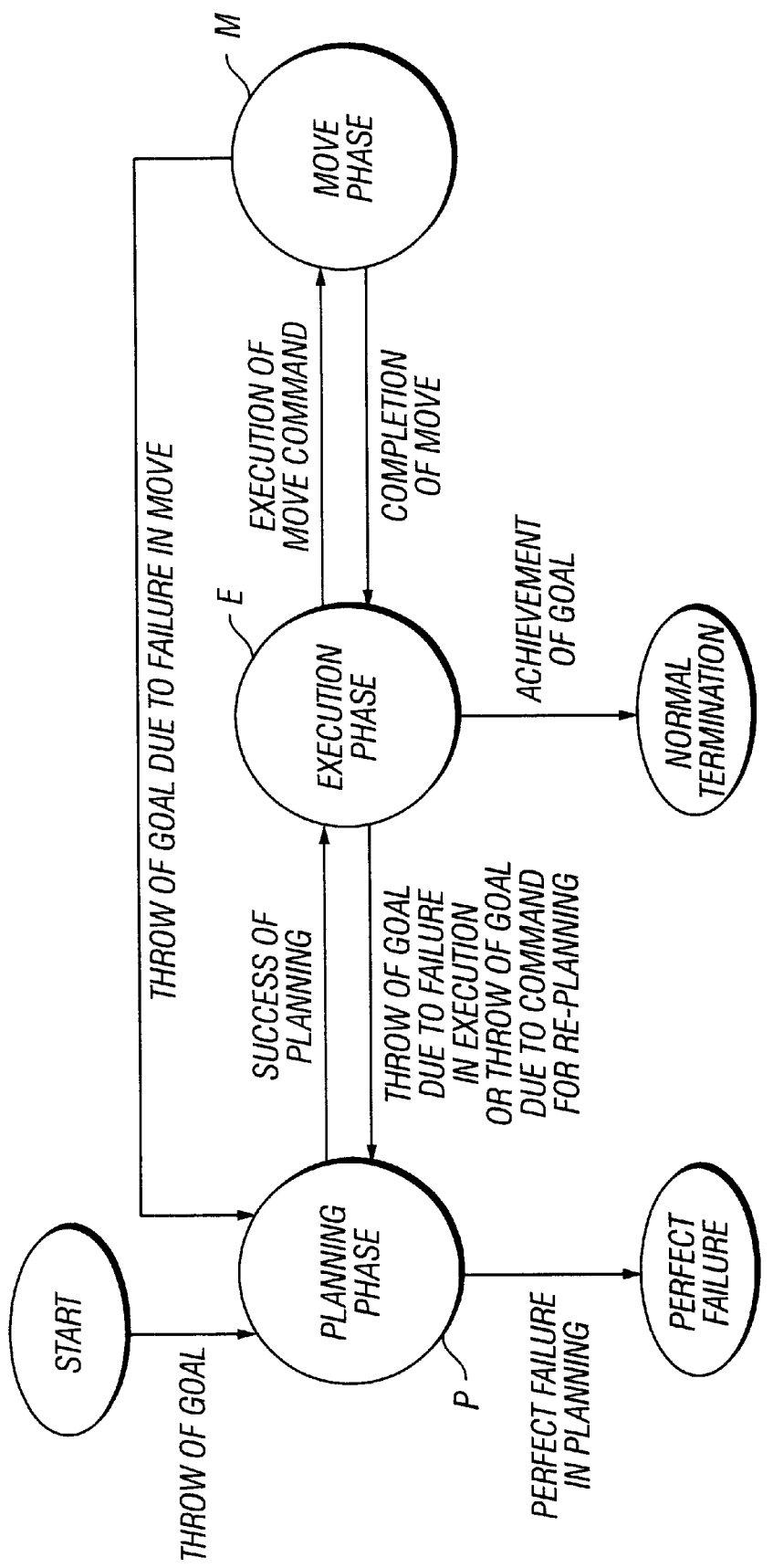
FIG. 22 is a conceptual view showing a lifecycle of the agent in the conventional agent system.
Figure 23:
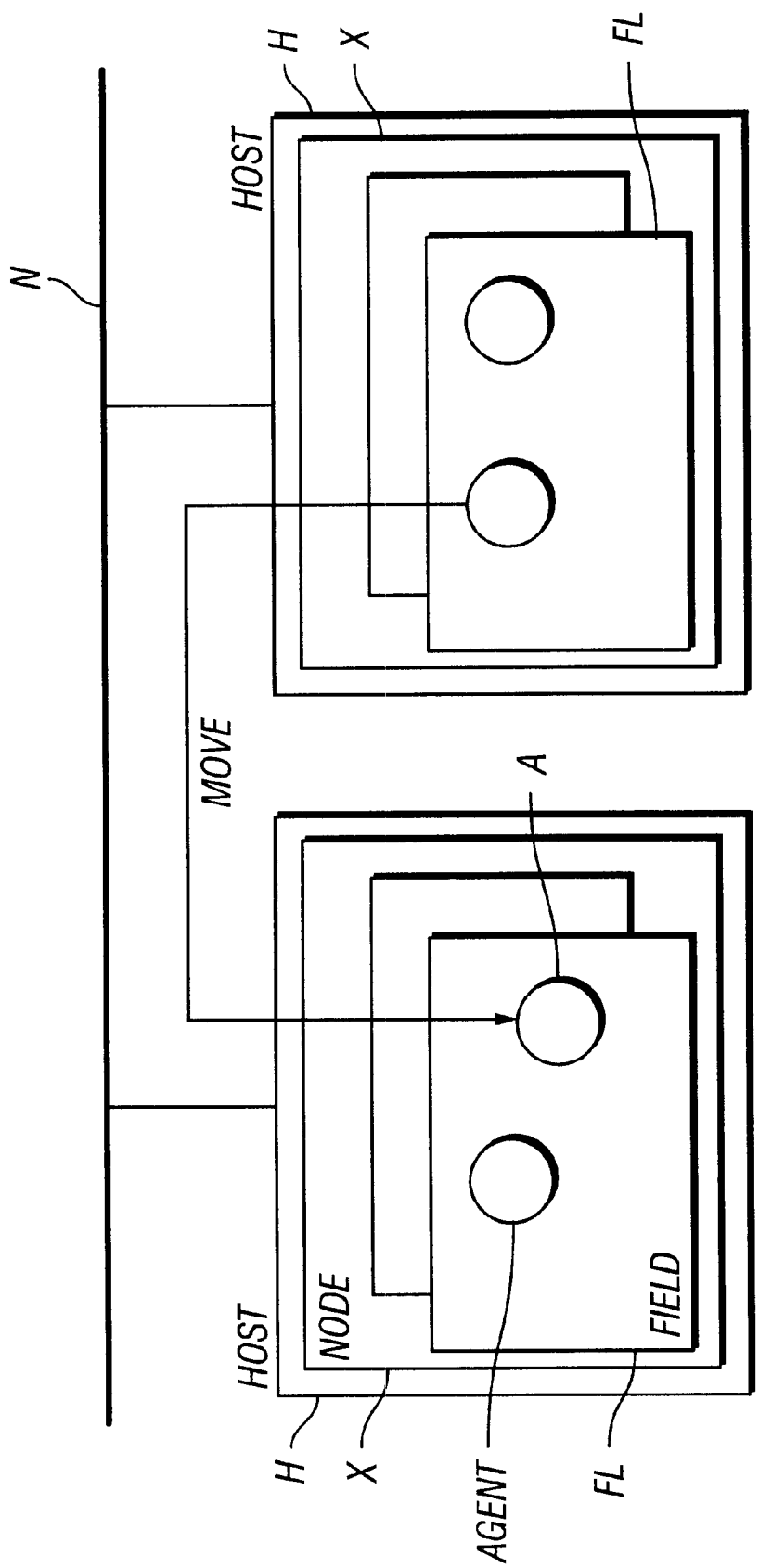
FIG. 23 is a conceptual view showing a situation in which a plurality of firms (fields) exist on the node in the conventional agent system.

In these procedures, the planner 115 generates the plan 115 from the information relating to the object and the action definition. At this time, the script names are fetched out from the action definition of the required action and combined, where the plan 116 as the list of the script names is generated. Specifically, in the planning (step 121), as shown in FIG. 18 to FIG. 20, by referring to the action definition, the beforehand condition and the ex post facto condition are connected, and a string of the script names to be called out, which includes the information of the original object to a goal achievement, is generated. Such list of the script names is called a script calling string.

1-2-3. Execution of Plan

When the plan 116 generated in the above described manner is executed, the executor 117 fetches out the script name one by one, which is described in the script calling string generated as the plan 116, and the script entity corresponding to the script name is read out from the second storing means 112. Delivery of the necessary variables is performed, and then the operation procedure described in the script entity is sequentially executed.

To be concrete, the executor 117 fetches out the script calling included in the script calling string one by one (step 122). If the script calling can not be fetched out, the step returns to the planning (step 123), and the script name is cut out from the character string of the script calling fetched out. The script entity having the same name as that of the script name cut out is read out from the second storing means 112 (step 124).

1-2-4. Delivery of Variable Value

Furthermore, the executor 117 passes the variable value between the variable used for the total of the plan and the variable used for the execution of the individual script, prior to the execution of the script entity. Specifically, the script variable names used for the script entity called out are matched with the calling parameters passed from the calling side depending on the description orders of both of the script variable names and the calling parameters, and the variable value of the plan corresponding to each calling parameter is passed to the script variable, thus storing the passed value in the four storing means 114 (step 125). For example, in the above described embodiment, the variable name of each calling parameter and the variable name of the script entity are made to correspond to each other as described below.

Node=$node
    'inform.dat'=$filename
    OriginNode=$origin

The executor 117 executes the procedure for the information processing using the variable value passed in such manner, according to the description of the script (step 126). When the execution for one script entity is completed, the procedure from the processing for fetching out the script calling (step 122) is iterated.

1-3. Effect

As described above, in the first embodiment, since a script entity is separated from an action definition, the script can be freely described, for example, using a control structure such as a conditional branch, without any limitation due to a language form and a grammar structure used for the description of the action definition.

2. Second Embodiment

Update of Knowledge

Next, the second embodiment of the present invention corresponds to the claims 6 to 12. The second embodiment is configured such that, in an agent system in which an gent processes information depending on a plan generated based on presented knowledge, the foregoing knowledge is updated by information acquired by an execution of the plan.

2-1. Structure

Figure 3:
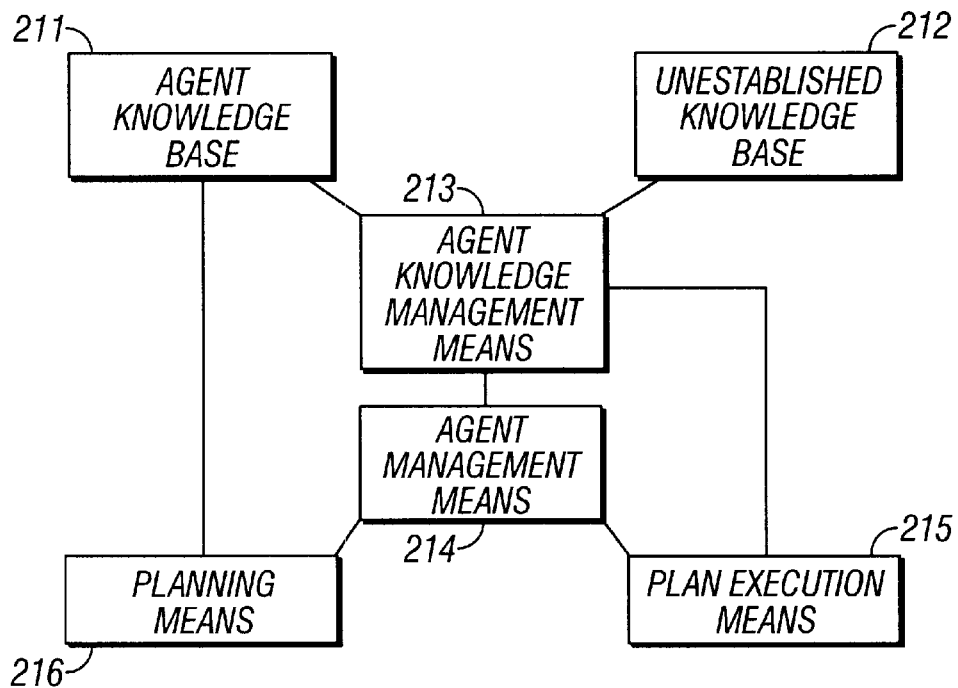
FIG. 3 is a functional block diagram showing a structure of a node in a second embodiment of the present invention.

The second embodiment is an agent system in which a plurality of nodes are connected to each other by a computer network, and FIG. 3 is a functional block diagram showing a structure of a node of the second embodiment.

As shown in FIG. 3, the node in the second embodiment comprises an agent knowledge base 211 for storing the established knowledge; and planning means 216 for generating a plan based on the knowledge. Here, the knowledge is information which expresses components of the agent system used for a planing, and which indicates the existence of a file in the node and the kind of the file existing in the node.

Furthermore, each node of the second embodiment comprises plan execution means 215 for executing the plan generated; an unestablished knowledge base 212 for storing unestablished knowledge used for the plan; and an agent knowledge management means 213 for updating the knowledge by the information which is found by the execution of the plan. Furthermore, each node in the second embodiment comprises an agent management means 214 for managing the agent.

2-2. Operation 2-2-1. Planning Using Unestablished Knowledge

In the second embodiment having the above described structure, the agent management means 214 controls the operation of the whole of the agent system. The planning means 216 generates the plan according to the control, and the plan execution means 215 executes the generated plan. Subsequently, when a knowledge using a unestablished fact which is not verified until the plan is actually executed comes to be requested at the time of the generation of the plan, the unestablished knowledge is used for the plan, while including the variable expressing a unestablished fact. The unestablished knowledge is stored separately from the tablished knowledge. After the generation of the plan, the unestablished knowledge is updated after information required is concretely verified by executing the generated plan.

Figure 4:
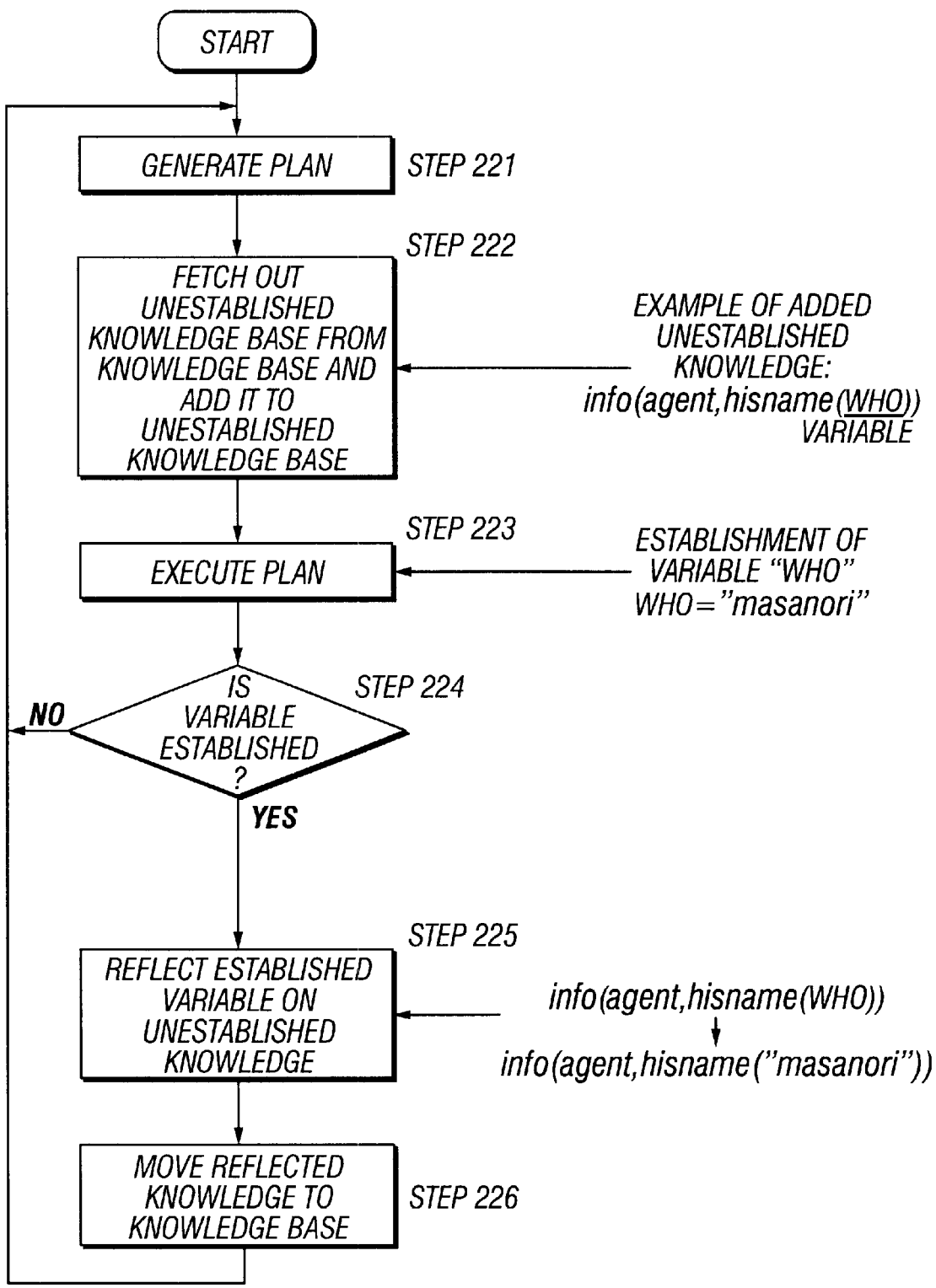
FIG. 4 is a flowchart showing a processing procedure in the second embodiment of the present invention.

Here, FIG. 4 is a flowchart showing processing procedures in the second embodiment of the present invention. For example, when the planning means 216 generates the plan (step 221), it is assumed that the item of "hisname" among the knowledge which is kept by the agent has to be used for the plan. However, the concrete content of the item "hisname" is not yet unestablished, and it is expected that the item "hisname" is established by referring to a file and the like at the time of executing the plan. In this case, the agent knowledge management means 213 adds the unestablished knowledge including the unestablished variable WHO, info(agent, hisname(WHO))

To the agent knowledge base 211, provisionally. The unestablished knowledge is used for the plan as the knowledge "hisname" is unestablished. In this case, as an example, in order to use this knowledge as a parameter of an instruction of "get His Name < >", the instruction is described in the plan using the unestablished variable WHO which is expressed as follows.

getHisName(WHO)

Specifically, in this instruction, the variable WHO in the unestablished knowledge corresponds to the parameter of the instruction.

2-2-2. Retention of Unestablished Knowledge

In this case, when the planning is terminated, the agent knowledge management means 213 fetches out this unestablished knowledge from the agent knowledge base 211, and adds it to the unestablished knowledge base 212 (step 222). Then, the agent knowledge management means 213 records the correspondence relation between the variable WHO used for the plan as the parameter and the unestablished knowledge added to the unestablished knowledge base which is expressed as follows, and manages it.

info(agent, hisname(WHO))

Noted that though the established knowledge is referred at the plan generation, the knowledge as established is stored in the unestablished knowledge base 212 at the time of the planning, separately from knowledge in the agent knowledge base 211, and is not an object to be referred to at the time of the planning until it is established.

2-2-3. Definition of Value by Execution of Plan

When the planning is terminated, the agent management means 214 makes the plan execution means 215 start its operation, and the plan execution means 215 which starts its operation executes a plan including the foregoing unestablished knowledge (step 223). At the time when the plan is executed, the plan execution means 215 sequentially interprets each instruction in the plan in the interpretive form. When a file and the like having a concrete content of the variable WHO is accessed by the execution, the variable WHO is made to correspond to the concrete value. Then, the correspondence relation between such variable WHO and the concrete content is kept by the plan execution means 215.

After the plan is executed in the above described manner, the agent management means 214 checks whether or not the value of the variable in the plan is established, that is, the value is bound to the variable in the plan, before the step proceeds to the next planning (step 224). To perform this checking, it is satisfactory that all variation names in the unestablished knowledge base 212 are listed, these variable names are passed to the plan execution means 215, their states are inquired, and determinations of whether or not the results of the inquiries are established are executed.

2-2-4. Update of Knowledge

At this time, if the value of the variable is established as written below.

variable WHO="masanori"

The agent management means 214 passes the established value of the variable to the agent knowledge management means 213. The agent knowledge management means 213 replaces the variable included in the unestablished knowledge in the unestablished knowledge base 212 by the established value of this variable to define the unestablished knowledge (step 225)

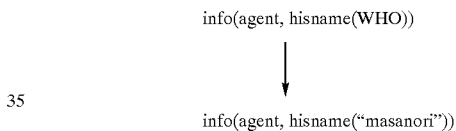

Moreover, the agent management means 213 allows the knowledge established in such manner to move from the unestablished knowledge base 212 to the agent knowledge base 211. The knowledge which is established and moved to the agent knowledge base 211 is referred to in the subsequent planning.

2-3. Effects

As described above, in the second embodiment, although the knowledge is established by information which would be acquired in the execution of the plan, this knowledge is unestablished at the time of the planning. This knowledge is previously stored in a certain form separately from the established knowledge, and established by the information acquired by the execution of the plan. The knowledge established in such manner is added to the established knowledge. The agent automatically executes a series of processing, whereby a necessity to describe the update of the knowledge in the plan is removed, thus removing troublesomeness and complexity in describing the plan.

Furthermore, in the second embodiment, since only the established knowledge is referred to at the time of the planning, a certainty of the plan generated by the planning is enhanced. Noted that not only the knowledge kept by the agent is updated, but also all of knowledge such as knowledge existing in the node and the firm can be updated in the above described manner.

3. Third Embodiment

Control of Re-planning

The third embodiment corresponds to the claims 13 to 16. In an agent system in which an agent processes information by executing a plan, with reference to the re-planning operation when the agent may fail in executing the plan, a user can freely determine that he previously defines the re-planning for each desired portion of the plan, or he commits the re-planning to an operation of a default on the system.

3-1. Structure

Figure 5:
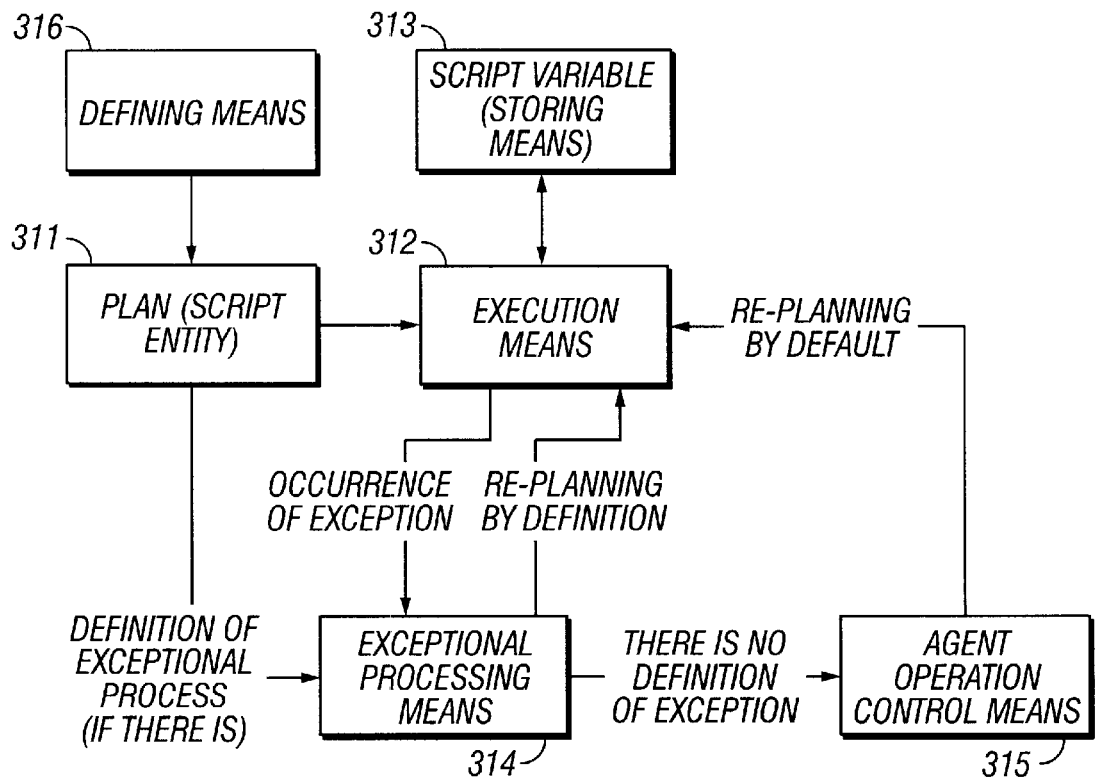
FIG. 5 is a functional block diagram showing a structure of a node in a third embodiment of the present invention.

In the third embodiment, a plurality of nodes are connected by a computer network. FIG. 5 is a block diagram showing a structure of each node in the third embodiment. As shown in FIG. 5, each node in the third embodiment comprises means 316 for defining an exceptional process when an execution is failed for a desired portion of a plan 311 (script entity); and storing means 313 for storing a script variable used for an execution of the plan.

Each node in the third embodiment furthermore comprises exceptional process means 314; and agent operation control means 315. The exceptional process means 314 serves to execute a defined exceptional process when the execution of the plan is failed in the portion of the plan where the exceptional process is defined, and the agent operation control means 315 serves to execute the re-planning operation predetermined, when the execution of the plan is failed in the portion of the plan where the exceptional process is not defined. It is not unnecessary to provide the means 316 for defining an exceptional process in all nodes, and it is satisfactory that the means 316 is provided in a node which defines the exceptional process.

3-2. Operation

The third embodiment having the above described structure operates as follows.

3-2-1. Definition of Exceptional Process

Figure 6:
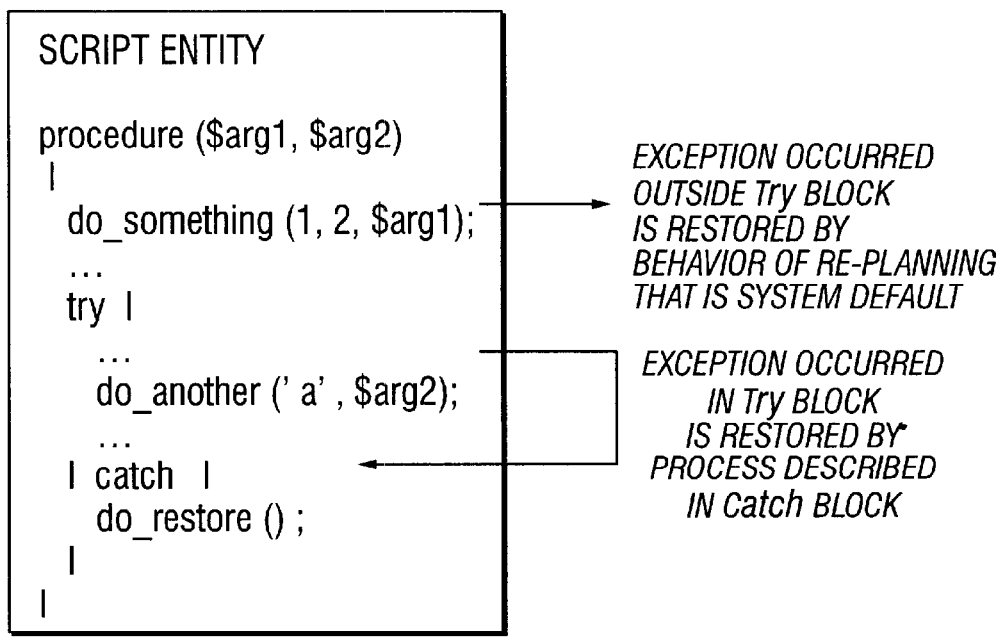
FIG. 6 is a view showing an example of a script in a plan for which an exceptional process is defined using a try block and a catch block in the third embodiment of the present invention.

Specifically, when an agent is generated in the third embodiment, a failure of the plan execution is handled as a sort of an exception, and an entity of the script is previously described in the form of FIG. 6, depending on whether or not the exceptional process is defined. Specifically, the portion which defines the exceptional process at the time of failure in the execution is described within braces { } of the keyword that is try { }, and the exceptional process for the portion describes the keyword that is catch { } immediately after the description of the portion. Description is made in the syntax { }

When with the use of these syntaxes a failure in the plan execution occurs in the described portion using the syntax { }, the exceptional process described using the syntax catch { } which is paired with the syntax try { } is executed.

3-2-2. Execution of Plan and Occurrence of Exception

Figure 7:
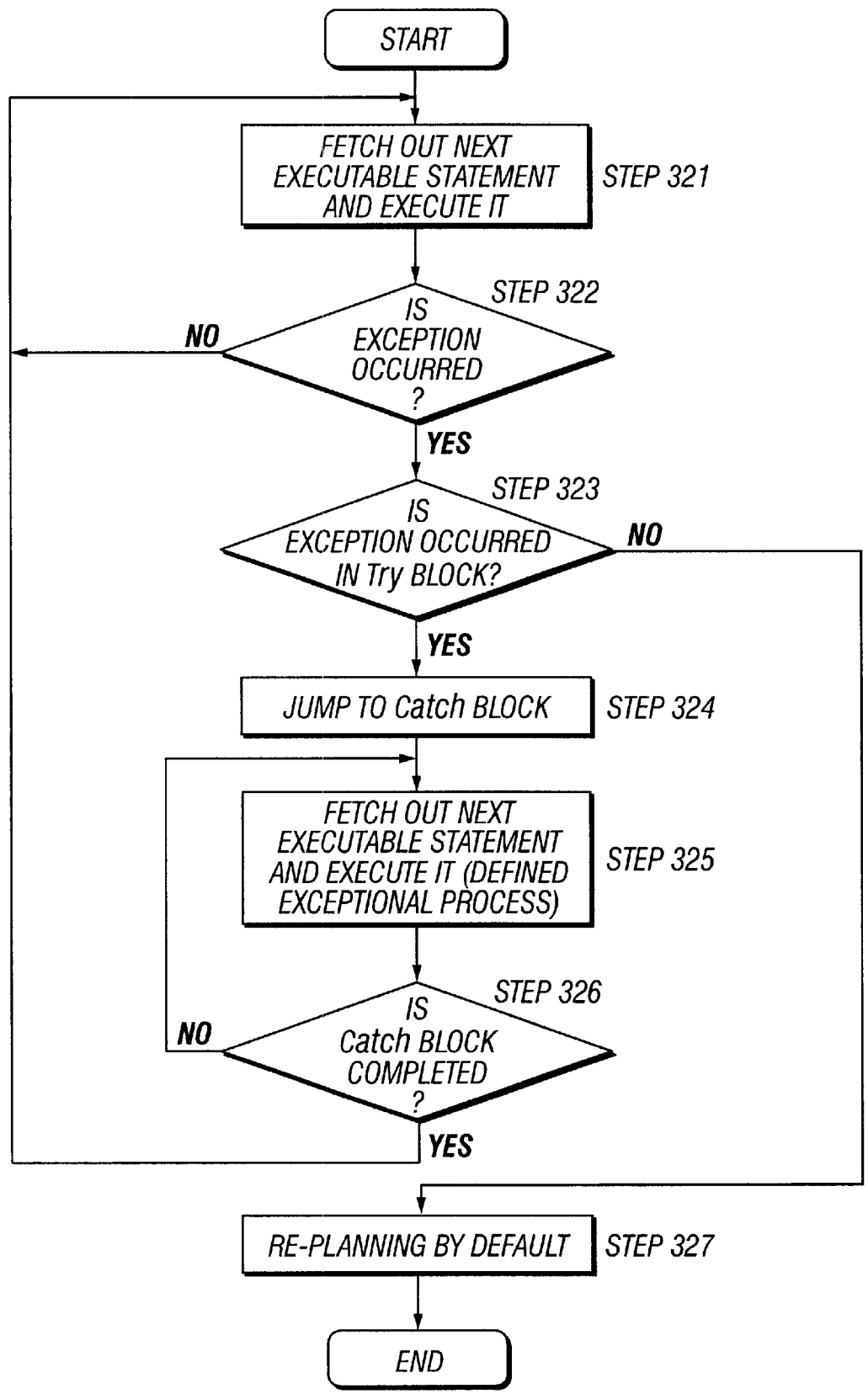
FIG. 7 is a flowchart showing a procedure of executing a plan in the third embodiment of the present invention.

FIG. 7 is a flowchart showing a procedure for executing the plan in the third embodiment. Specifically, as shown in FIG. 7, the execution means 312 sequentially fetches out an executable sentence from the plan and executes it (step 321). When a failure of the execution that is one sort of the exceptions occurs at the time of the execution (step 322), the execution means 312 sends a signal expressing the exception occurrence to the exceptional process means 314 as well as to the position on the script where the exception occurs.

3-2-3. Process for Exception Occurrence

The exceptional process means 314 which accepted the signal examines whether or not the position where the exception occurred is within the try block (step 323), and if the exception occurred within the try block, an exceptional process as defined in the catch block immediately after this try block is performed (steps 324 to 326). On the other hand, if the position where the exception occurred is not within the try block, the agent operation control means 315 performs the replanning according to the standard (default) on the system previously determined (step 327).

As described above, when a failure of the execution that is a sort of the exception occurs in the try block paired with the catch block, the role performed by the catch block that is a reserved word is to detect the signal indicating this failure and to jump an appropriate return processing in the catch block, at the time of the plan execution. Moreover, FIG. 6 shows a state in which different processing is performed depending on whether or not the position where the exception occurred is within the block.

3-2-4. Nest Structure of Syntax

Like

```
try{
    // normal process
}catch{}
try{
    //restoration process
}catch{
    //exceptional process for restoration process
}
}
``` by allowing the syntax using try block and the catch block to take the nest structure, the similar exceptional process can be applied also to the exceptional process itself. In this case, an ordinary process is described in the try block portion, and the restoration process is described in the catch block portion. An inherent restoration process is described in the try block portion, even within the catch block. The restoration process preparing for the case where a failure of the restoration process itself occurs is previously described in the catch block portion.

According this structure, when an exception further occurs throughout the restoration process for the failure of the execution, since the restoration process itself is made in the form of a block, the restoration process is made to correspond to the exceptional process described in the corresponding catch block. Noted that when the restoration process itself is not made in the form of a block, the replanning is performed according to a default with the occurrence of the exception throughout the restoration process.

3-3. Effects

As described, in the third embodiment, when the execution of the plan failed, since the re-planning is performed based on the standard (default) on the system which is predetermined, it can be freely selected for each portion of the plan whether or not the exceptional process for restoring from the failure is previously defined, so that a control of the agent relating to the re-planning is made easy.

Particularly, in the third embodiment, since the portion for defining the exceptional process and the exceptional process corresponding to this portion can be designated so as to correspond them to each other by a first syntax try { } and a second catch { } which respectively use determined keywords and braces { }, the definition of the exceptional process becomes easy.

4. Fourth Embodiment

About Security

The fourth embodiment is described below. In an agent system in which an agent processes information while moving among a plurality of areas existing on a network, when the agent intends to move between the areas such as nodes and firms and to execute the planning, the agent and each region make determinations as to a security.

4-1. Structure

Figure 8:
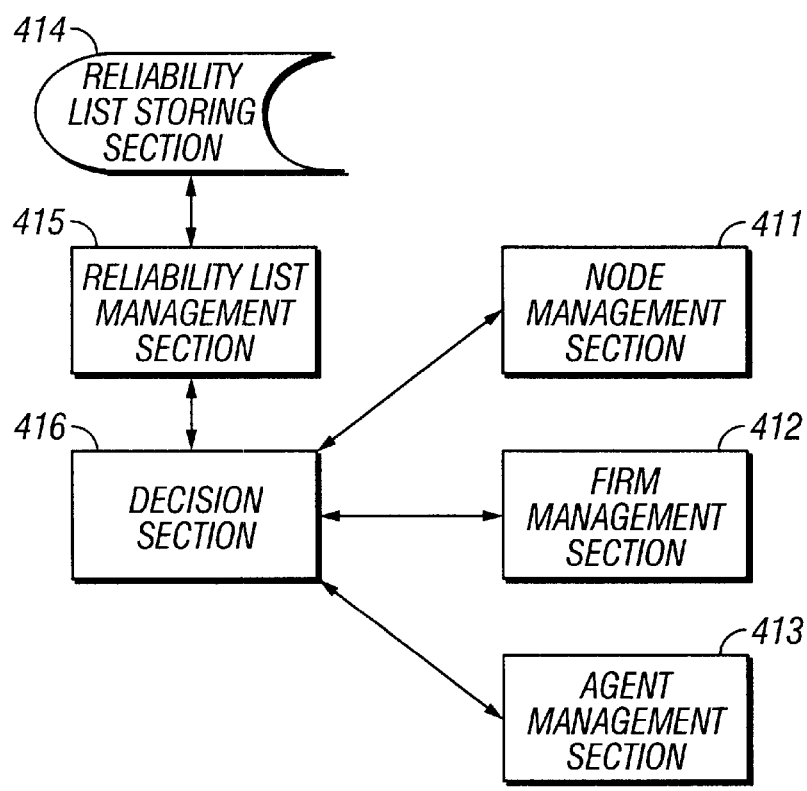
FIG. 8 is a functional block diagram showing a structure of a fourth embodiment of the present invention.

FIG. 8 is a functional block diagram showing the structure of the fourth embodiment. As shown in FIG. 8, the fourth embodiment comprises a node management section 411 and a firm management section 412 which manage each area, that is, a node and a firm; and an agent management section 413 for managing the agent. In the fourth embodiment, a plurality of nodes are connected by a computer network and a plurality of firms exist on each node, which are action area provided for different objects of the agent. The node management section 411, the firm management section 412 and the agent management section 413 exist on the node of the management object, the firm of the management object, and the node where the agent exists, respectively.

The fourth embodiment comprises a reliability list storing section 414; a reliability list management section 415; and a decision section 416. The reliability list storing section 414 stores a reliability list which indicates whether or not each region on the network can be relied on. The reliability list storing section 414 is equivalent to the foregoing first information. The reliability list management section 415 manages a update of the reliability list and an access thereto. The decision section 416 decides whether or not a presented area can be relied on by referring to the reliability list storing section 414 through the reliability list management section 415. Noted that the reliability list storing section 414, the reliability list management section 415, and the decision section 416 may be provided for each node, or for several node. Alternatively, they may be provided collectively in one position.

The firm management section 412 and node management section 411 of each node are structured so that when the agent intends to move from other regions, only the agent which moves from reliable area is accepted by making the decision section 416 decide the reliability of the area from which the agent moves. The agent management section 413 of each agent is structured so that when the agent intends to move between the areas, the agent is made to move only to a reliable area by making the decision section 416 to decide the reliability of the area to which the agent intends to move.

In the reliability list storing section 414, second information is stored, which indicates whether or not the agent is allowed to perform the planning in each area is stored. The reliability list management section 415 and the decision section 416 is structured so that by accessing to the second information, they decide whether or not the agent is allowed to performing the planning for a presented area. The agent management section 413 makes the decision section 416 refer to the second information, whereby the agent management section 413 avoids the planning by the agent in the area where the planning is not allowed. Noted that the reliability list that is the second information, and the second information should be stored collectively in one position such as a name server.

Furthermore, such reliability list may take any form. For example, when the firm is a unit, the following form is considered. Specifically, as a list form composed of records of the same number as the firms, three fields are presented for one record. The first field is a name and an identifier inherent in the firm, the second firm expresses its reliability by a rank such as A, B and C, and the third firm a flag indicating 1 when the firm allows the planning and 2 when it does not allow.

4-2. Operation

In the fourth embodiment having the above described structure, when the agent intends to move other areas thereto, the node management section 411 and firm management of each area make the decision section 416 decide the reliability of the area from which the agent moves, whereby they accepts only the agent which moves from the reliable area. Since it is considered that the management sections perform the decision of the reliability for each region and the agent, the descriptions concerning the management sections and the decision section are omitted in the following explanations.

4-2-1. Process in Agent Move

Figure 9:
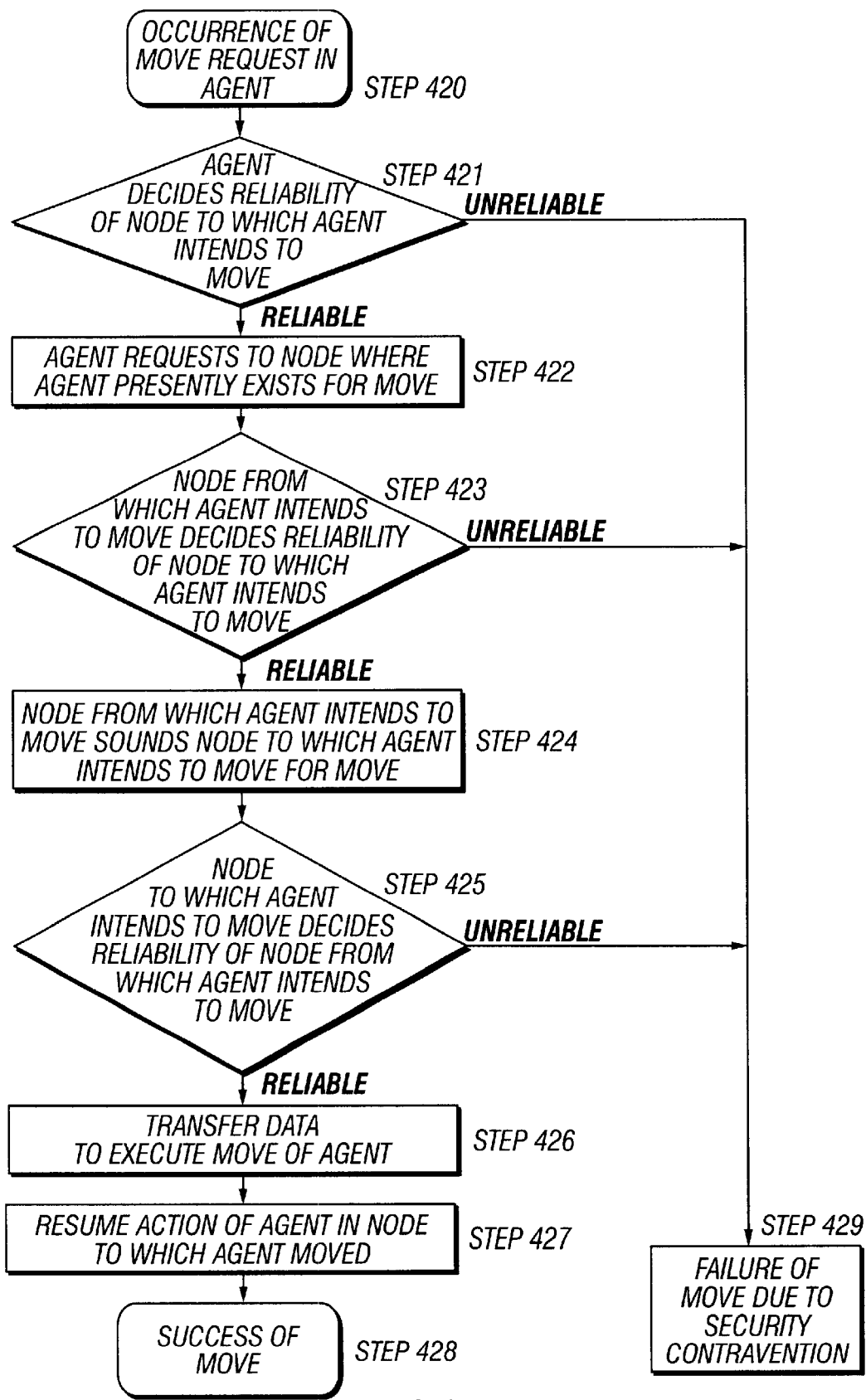
FIG. 9 is a flowchart showing a procedure applied when an agent moves between areas in the fourth embodiment of the present invention.

FIG. 9 is a flowchart showing a concrete example of process procedures in which the agent and the node decides the reliability of other nodes when the agent attempts to move between the nodes. Specifically, as a result of the execution of the plan by the agent, when the move request to other nodes is generated (step 420), the agent which intends to move decides the reliability of the node to which the agent moves (step 421), and when the node is reliable, the agent makes a request to the node where the agent presently exists for the move (step 422)

The node requested for the move decides the reliability of the node to which the agent intends to move (step 423), and when the node is reliable, the node sounds the node to which the agent intends to move on the move of the agent (step 424). The sounded node to which the agent intends to move decides the reliability of the node in which the agent presently exists (step 425), and when it is decided that the node in which the agent presently exists is reliable, data transfer from the node in which the agent presently exists to the node to which the agent intends to move is executed and the agent makes a move between the nodes (step 426). The agent moved in the such manner resumes its operation in the node to which the agent moved (step 427), leading to a success of the move (step 428).

When any of the nodes is decided to be unreliable in the steps 421, 423 and 425, a failure of the move due to a contravention to the security occurs (step 429), leading to a failure of the execution of the plan. When the plan was executed unsuccessfully as described above, it is satisfactory that the target of the move designated in the plan is changed to other down load sites where the file identical to that sought by the agent appears to be present, and the plan is executed again.

4-2-2. Process Relating to Planning

Figure 10:
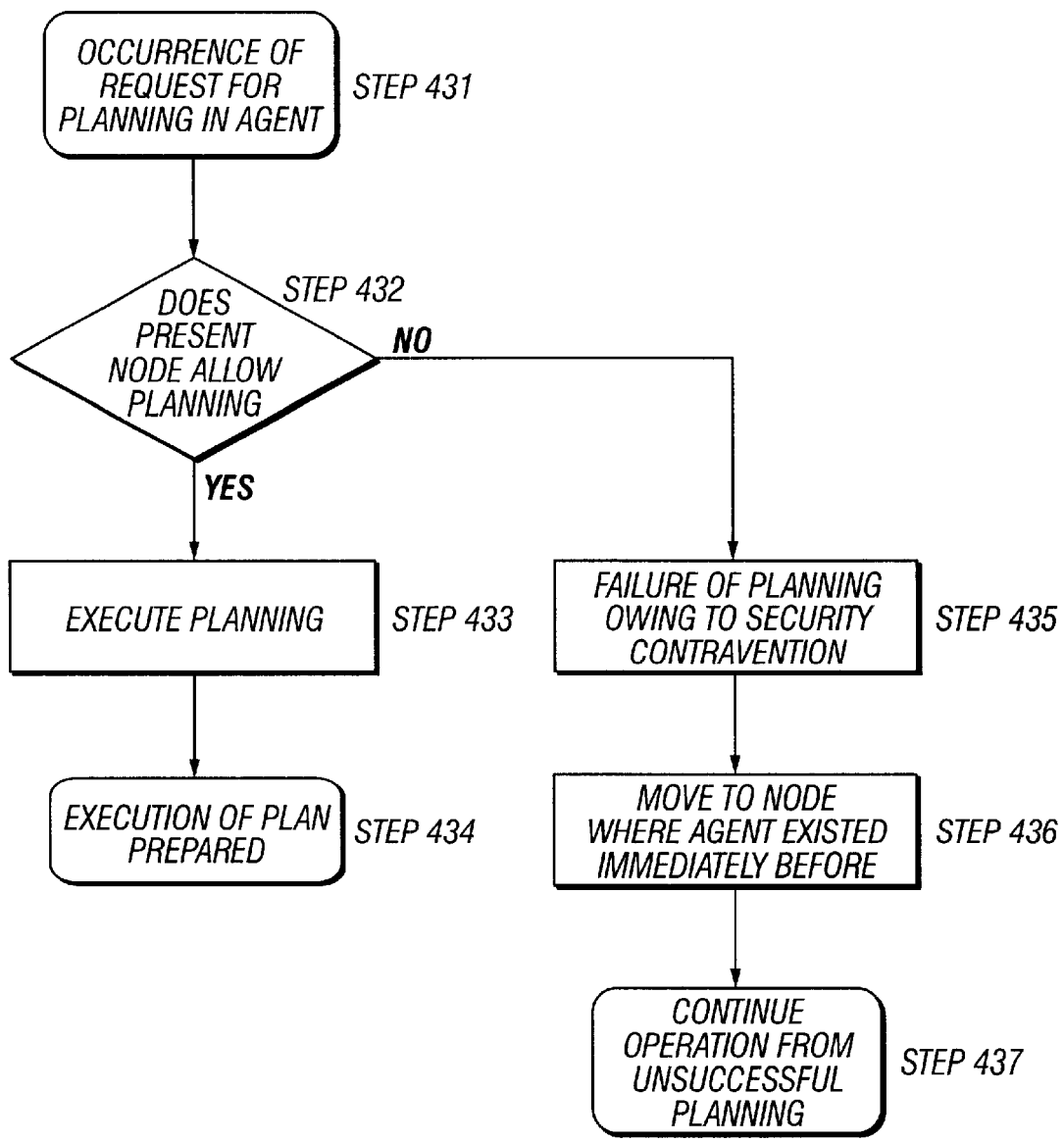
FIG. 10 is a flowchart showing a procedure relating to a planning in the fourth embodiment of the present invention.

Furthermore, the agent avoids to execute the planing on the node where the planning is not allowed. Here, FIG. 10 is a flowchart showing process procedures in the case where the agent requests the planning. Specifically, the planning request occurs (step 431), it is decided whether or not the node in which the agent presently exists allows the planning (step 432). When the node allows the planning, the planning is executed (step 433), and the generated plan is executed (step 434).

On the other hand, when the node in which the agent presently exists does not allow the planning (step 432), the planning is regarded as a failure owing to a contravention to a security (step 435). In such case, it is possible to adopt the countermeasure in which the agent returns to the node preceding to that by one (step 436), and the agent continues to execute an operation subsequent to the failure of the planning such as the re-planing (step 437). Furthermore, when it is previously known that the planning is not allowed in the node to which the agent intends to move, it is also conceived that a necessary planning is completed before moving and then the move is made.

4-2-3. Example of Decision of Reliability by Firm

Figure 11A:
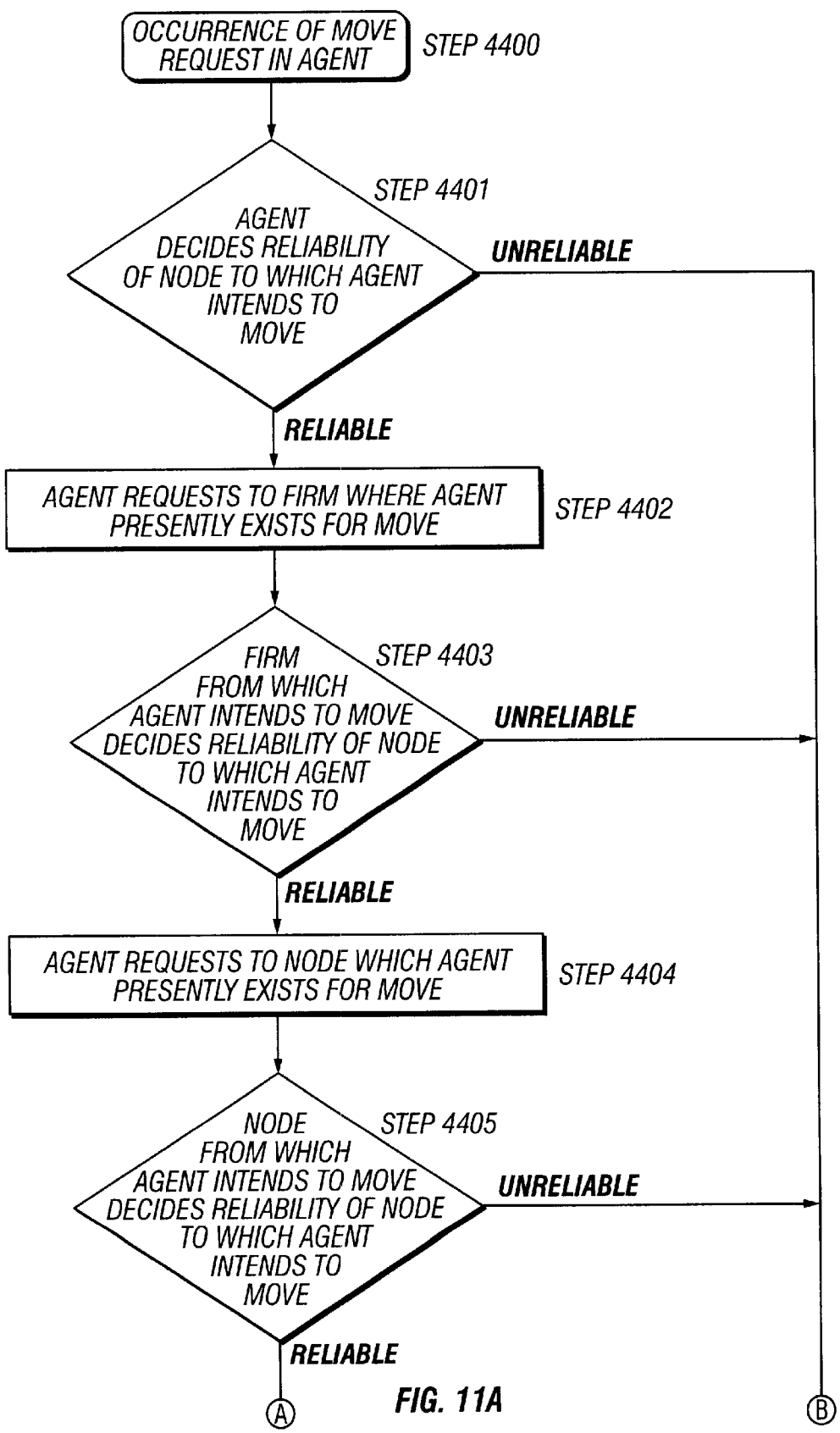
FIG. 11 is a flowchart showing a procedure applied when a firm as well as a node decides a reliability in the fourth embodiment of the present invention.
Figure 11B:
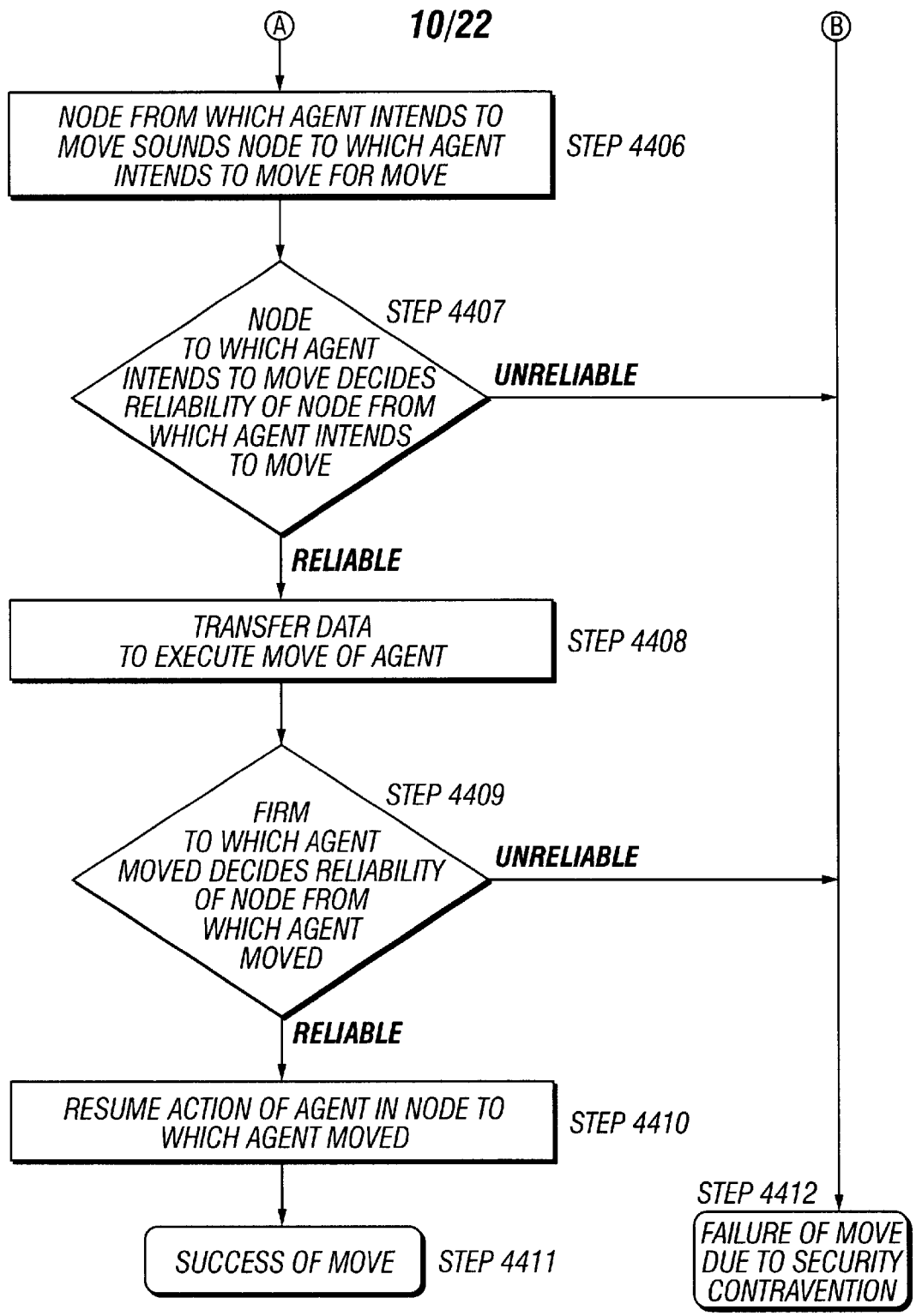

When the node is in the firm and the agent intends to move between the firms, FIG. 11 shows process procedures in the case where not only the node having the firm but also the firm decides of the reliability of both of the node to which the agent moves and the node in which the agent presently exists. In these procedures, since the decision of the security is performed multiply by the node and the firm, the safety of the information processing is more enhanced.

4-2-4. Decision Using Move History

The following procedures may be adopted. Specifically, to which area the agent moved is sequentially recorded in a history in the reliability list storing section 414 by the reliability list management section 415, and each area decides the acceptance of the agent based on the history of the agent, the reliability of each area, and the previously decided standard, when the agent intends to move thereto from other areas.

Then, based the area receiving the agent makes the decision based on the history for all nodes recorded in history, and when there are unreliable nodes in the history of the agent or the number of the unrealiable nodes the predetermined valued, the area refuses the acceptance of the agent.

4-3. Effects

As described above, according to the fourth embodiment, each area accepts an agent only form a reliable area, and the agent moves only to reliable area. For this reason, both of the agent and the area can reduce the risk of infringements by illegal accesses from each other.

Furthermore, in the fourth embodiment, since the area accepting the agent can decide not only the latest area from which the agent moves but also other areas in which the agent existed, the agent system of the present invention is effectively protected from the possibility of the infringement. For example, an area conceiving an evil intention may falsify the agent coming thereto and equip it with a harmful function such as computer virus, and may substitute the agent for a harmful agent. For this reason, the area accepting the agent locks out an agent which existed in a unreliable area in the past, based on its history, whereby the area accepting the agent can avoid infringements by the agents which was equipped with the foregoing harmful function and substituted.

Furthermore, in the fourth embodiment, a planning in an area which does not allow it can be avoided. Therefore, an area is protected from an agent which generates a plan having a harmful script and perform a harmful processing and intends to perform a harmful process by making it look like a planning. Moreover, when the area has no enough resources to make the agent perform the planning, the resources are never consumed improperly.

Furthermore, for the agent, the agent is protected from an area which pretends to support the planning and intends to equip the planning with a unjustified scrip. Since the planning is performed only in an area where a knowledge base is fully fitted up, an appropriate plan is generated and information processing is smoothly performed.

If information indicating whether or not each node is reliable is preserved collectively in one spot such as a name server, and if each node refers to the collectively preserved information, a preservation area of the information relating to the reliability can be saved, and a updating of the information can be centralized, so that a situation that information of each node differs from others can be avoided. When a person and an area having an evil intention intend to falsify the information itself relating to the reliability, it is satisfactory to preponderantly strengthen the security for one spot preserving the information.

5. Fifth Embodiment

Trace and Restoration of Agent

The fifth embodiment corresponds to the claims 25 to 30. In an agent system in which an agent moves between plural nodes to process information, information of the agent is previously preserved and the agent can be restored when the agent extinguished due to trouble of the node.

5-1. Structure

Figure 12:
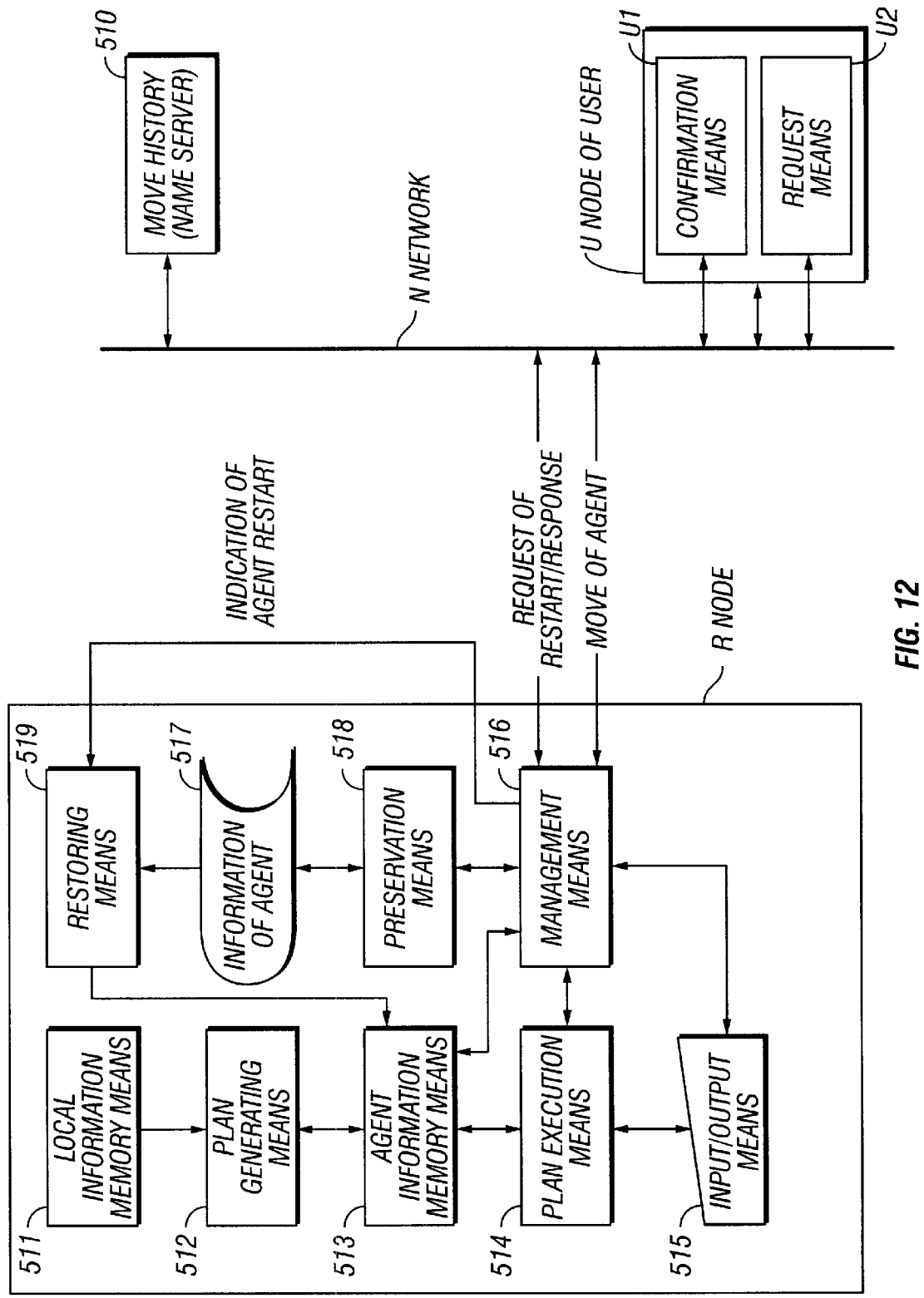
FIG. 12 is a functionally block diagram showing a structure of a fifth embodiment of the present invention.

In the fifth embodiment, the plural nodes are connected by a computer network. FIG. 12 is a functional block diagram showing a structure of the fifth embodiment, in which specified one node R is exemplified for its concrete structure. As shown in FIG. 12, the node R comprises local information memory means 511 similar to that described in FIG. 16; plan generating means 512; agent information memory means 513; plan execution means 514; input/output means 515; management means 516 which is equivalent to the agent management means 7 shown in FIG. 16; preservation means 518 for preserving information 517 of the agent; and restoring means 519.

The information 517 of the agent that is a preservation object is the one with which the agent can be restored later. That is, the information of the agent is a plan of the agent and a variable area thereof. Moreover, the preservation means preserves the information 517 of the agent immediately before the agent moves to other nodes and immediately after the agent moved from other nodes. The restoring means 519 restores the agent using the preserved information 517 when the agent extinguishes due to troubles. This restoring means 519 is constructed such that it automatically restores the agent when the node is restarted and restores the agent in the case when the means 519 receives the request for the restoration of the agent.

Furthermore, in the fifth embodiment, a name server 510 of the network N is constructed such that it sequentially records as a history to which node the agent moves. In the node U of the user which is used for sending out the agent generated by the user to the network N, confirmation means U1 and request means U2 are provided.

The confirmation means U1 communicates with the name server 510 to verify the latest node recorded in the foregoing history, and communicates with the latest node to verify the state of the agent in the latest node. Furthermore, the confirmation means U1 is also used to verify nodes where the agent existed before the latest node based on the foregoing history when the agent extinguishes in the latest node. The request means U2 requests other nodes verified to restore the agent.

5-2. Operation and Ethics

Figure 13:
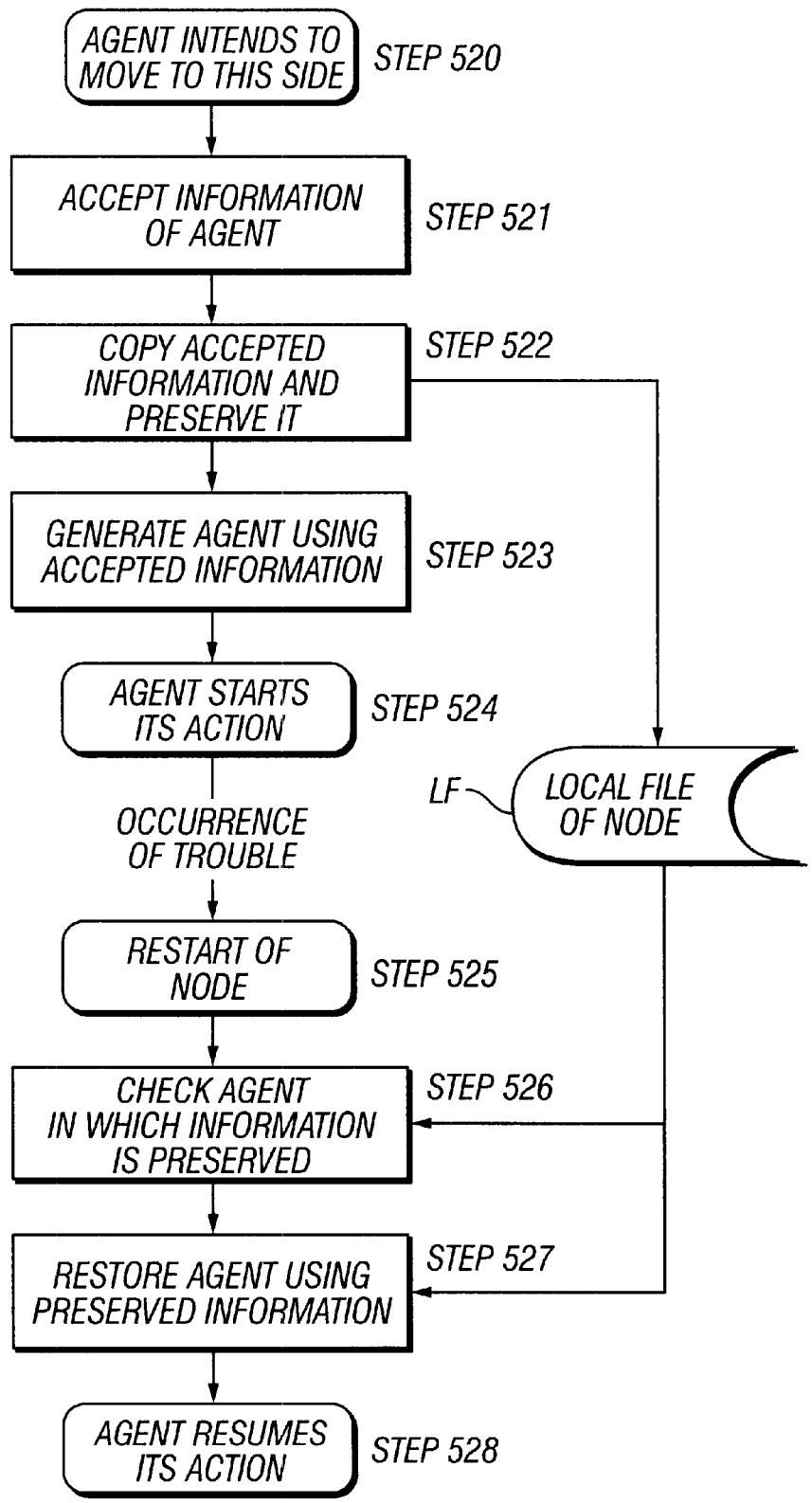
FIG. 13 is a flowchart showing a procedure in which information of an agent is preserved and the agent having disappeared due to trouble of a node is restored in the fifth embodiment of the present invention.

In the fifth embodiment having the above described structure, in the node which accepts the agent moving thereto, process processings in the case where the agent is automatically restored after removing the trouble are shown in a flowchart of FIG. 13.

5-2-1. Preservation of Information

When the agent moves to this side (step 520), upon acceptance of the information of the agent by the agent management means (step 521), the preservation means 518 copies the information presented thereto, that is, the information of the agent immediately after the move of the agent, and preserves it in the local file LF of the node (step 522). Here, the preserved information 517 includes all of information necessary for continuing the action of the agent, and, to be concrete, the information 517 may be determined according to the system structure such as variables for executing the plan and files possessed by the agent. Noted that in the node sending out the agent, the information 517 of the agent immediately before the move is preserved.

5-2-2. Restoration of Agent

After the agent moving to this side begins its action (step 524), in the case where the agent interrupts the action due to occurrence of trouble in the node from which the agent has already moved, when the troubles are removed and the node restarts (step 525), the restoring means 519 checks the presence of an agent extinguished due to the trouble among the agents in which the information is preserved. The agent extinguished is restored using the information 517 preserved (step 527), and the restored agent resumes it action (step 527).

5-2-3. Recoding of Move History

If which node the agent moves through is sequentially recorded as a move history in the specified node such as the name server 510, the node and the user can trace the agent by utilizing this move history. Generally, the name server (naming service) means a server for retrieving an IP address form a node name. The move history needs not necessarily to be preserved in the name server, and it may be preserved in other proper server or in the agent.

Figure 14:
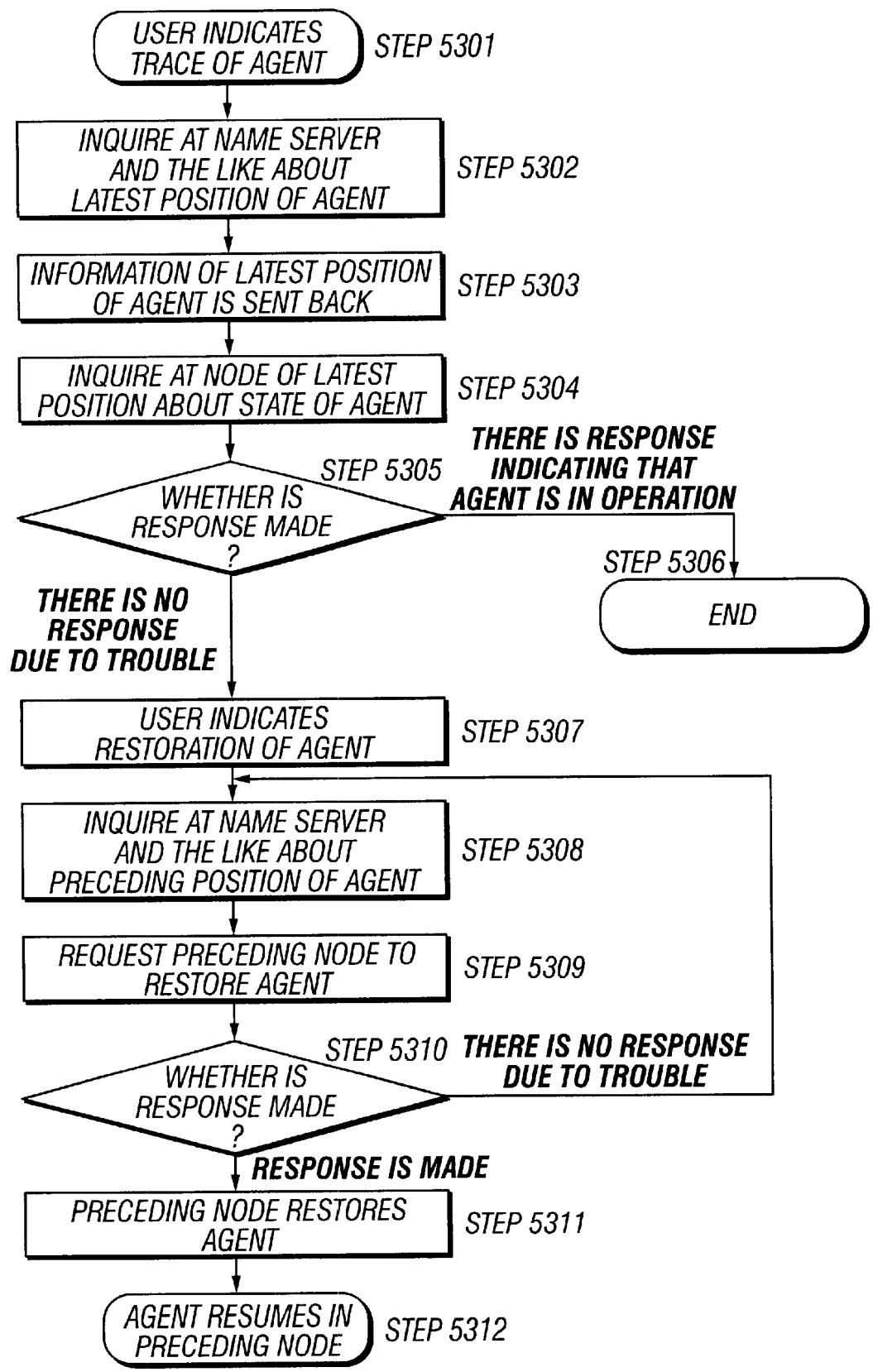
FIG. 14 is a flowchart showing a procedure in which a user traces an agent to request a restore in the fifth embodiment of the present invention.

FIG. 14 is a flowchart showing process procedures in which the user traces the agent utilizing the history preserved in the foregoing manner and requests the restoration of the agent according to demand.

5-2-4. Verification of Latest Position

It is assumed that the user who sent out the agent from the node U used by himself indicates his node on the trace of the agent (step 5301). An inherent ID is allocated for each of all agents when it is originally generated in the user's node U, and an agent to be an object is specified based on the ID, in a query about the agent and a request for the restoration of the agent.

In the use's node U, upon receipt of the command for the trace of the agent, the confirmation means U1 inquires at the name server 510 which preserves the move history of the agent about the latest position of the agent (step 5302). The name server 510 inquired sends back the node finally added to the move history as information relating to the latest position (step 5303). In this case, the agent is considered to be present in the node of the latest position.

5-2-5. Verification of State of Agent

For this reason, the confirmation means U1 of the node U inquires at the node of the latest position about the state of the agent (step 5304). For this inquiry (step 5305), when the confirmation means U1 receives a response indicating that the agent is in operation, since the agent normally continues to operate, the processing is terminated (step 5306). On the other hand, when a trouble such as a system down occurs in the node of the latest position, no response is made, whereby it is proved that the agent interrupts its action due to the trouble of the node.

5-2-6. Request for Restoration of Agent

In this case, the user indicates the node U on the restoration of the agent by user's own decision. Upon receipt of this indication, the confirmation means U1 of the node U inquires at the name server 510 about the position of the node where the agent existed, which precedes by one to the node where the trouble occurred, and then acquires the result (step 5308). Then, the request means U2 of the node U requests the node preceding to the node where the trouble occurred to restore the agent (step 5309).

When no response is made for this request for the reason why the trouble occurred also in the preceding node (step 5310), the processing returns to the step 5308, and the inquiry is made for the node preceding to the node which is requested in the step 5309. The restoration of the agent is requested (step 5309). When the preceding node normally functions, the agent is restored by the preceding node (step 5311), and the agent resumes its action in the node immediately before the node where the trouble occurred (step 5312).

5-2-7. Example of Restoration of Agent

Subsequently, an example in which the agent extinguished due to the trouble is restored will be described. For example, it is assumed that the agent moves sequentially in the order of the nodes A, B and C, and when the agent exists in the latest node C, the agent extinguishes due to a system down of the node C. In this case, when the node C is restarted using information immediately after the agent moves to the node C, the agent is automatically restored, and the agent executes its action in the node C again.

As another example, it is assumed that as a result that the user traces the agent generates by the user, the user finds that the agent which must be in the node C does not operate because of a trouble. In this case, it is assumed that the user designates the node B preceding to the node C and requests the node B to restore the agent. Upon receipt of this request, the node B restores the agent using the information preserved immediately before the move to the node C, and the agent resumes its action at the state immediately before the move.

The agent which resumed the action intends to move to the node C again, and in the case where the node C does not operate at this point of time, the move to the node C will be performed unsuccessfully. The agent executes the re-planning for aiming at other node (for example, mirror site) likely to have the identical data with that of the node C as the next move object, and the agent executes the newly generated planning and continues its action.

Though it is considered that the information should be preserved in the latest node where the agent presently exists and the node preceding to this node, the number of the nodes can be varied appropriately by increasing it to three, for example, including the latest node.

5-3. Effects

As described above, in the fifth embodiment, when the agent moves, information capable of restoring the agent, such as the plan and the variable area of the agent, is previously preserved at nodes to and from which the agent moves. When the agent has disappeared due to trouble of the nodes, the agent is regenerated and restored from the preserved information, automatically or by a request of a user, whereby the processing is resumed. Therefore, the agent can continue its action from the state slightly before the agent has disappeared. It is unnecessary for the user to generate the agent from the beginning again as well as for the agent to execute the processing from the beginning again.

To be concrete, when the node after move can be normally restarted, it is possible for the agent to resume its action at the state immediately after the agent moves to that node. And, when the trouble state is kept at the node after the agent moves thereto, the agent can resumes its action, at the state before the agent moves from the preceding node.

When the agent is automatically restored at the time of restarting of the node, the duty of the user and manager of the agent system to request and indicate the restore of the agent can be removed. On the other hand, with reference to the case where the agent is restored upon receipt of the request from the user, even when the node where the agent extinguished is not restored from the trouble, the user can restore the agent by requesting other desired nodes where the agent existed for the restore of the agent.

Particularly, with the use of the move history of the agent, the user can verify the present state of the agent by tracing it, or can request the node where the agent existed to restore the agent.

6. Other Embodiments

The present invention is not limited to the above described embodiments, and the present invention includes the following exemplified other embodiments in its scope. For example, in the present invention, the scale, form, and node number of the network can be determined freely, and the language form which describes the sort of the information processing executed by using the agent, the action definition, the knowledge, and the plan can be freely selected.

Furthermore, in the second embodiment, it is determined at to whether the value of the variable used for the unestablished knowledge is established, and the processing for reflecting the established value on the knowledge may be arbitrarily performed. Specifically, in the second embodiment, though the check is made after all of the plan generated is completed, the check may be made every one execution of the instruction in the plan. Furthermore, the knowledge which is desired to be referred to at the time of the planning and used for the plan can be conceived at its unestablished state including the variable. For this reason, it is conceived that the unestablished knowledge keeping the variable can be referred to in the planning according to the manner for the established knowledge.

Moreover, the user may freely designate as to whether the user refers to the unestablished knowledge in the planing. If the user freely can designate according to the nature of the unestablished knowledge as to whether the user refers to the unestablished knowledge in the planning, the degree of freedom for handling the knowledge increases and a flexible use of the system becomes possible.

In the fourth embodiment, though the reliability list is preserved collectively in one spot, the reliability list can be provided in the node, the firm and the agent, individually. In this case, it is satisfactory that the agent has information indicating whether or not each node and each firm allow the planning operation. When the reliability list is preserved dispersedly, for example, with reference to the reliability list of the node, the manager for the node collects the information and preserves it. Furthermore, with reference to the reliability of the agent, the person who requests the generation of the agent to execute the information processing prepares the reliability list. When the node secondarily generates another agent in order to make this agent execute a part of operations for the original agent, which are to be executed by the original agent, the node generating presents the secondary agent the reliability.

As described above, according to the present invention, the script can be freely described without any limitation due to a language form of the action definition, so that an agent system technology for generating an excellent plan can be provided.

Furthermore, the update of the knowledge using the information acquired by the execution is constructed as a function of the agent, so that it is unnecessary to describe operations for the update in the plan. By diversifying the contents of the re-planning, flexibility of the move performed by the agent can be enhanced. Furthermore, when the agent moves between the nodes, the agent determines the reliability of the node to which the agent moves and that of the node from which the agent moves, and also each of the nodes determines the reliability of the other node, so that the safety of the information processing is improved. The information for restoring the agent is preserved at the time when the agent moves, so that the agent which interrupts its action due to the trouble of the node can resume its action. By these effects, the agent system technology for generating an excellent plan can be provided.

Although the preferred embodiments of the present invention have been described in detail, it should be understood that various changes, substitutions and alternations can be made therein without departing from spirit and scope of the inventions as defined by the appended claims.

What is claimed is:

1. An agent system in which an agent processes information while moving among a plurality of areas on a network, comprising:

management means for managing the agent and each of said areas; and first information indicating whether or not each of said areas on the network is reliable, wherein said management means for managing the agent decides a reliability of an area to which the agent intends to move based on said first information, and allows the agent only to move to a reliable area, when the agent intends to move among said areas; and said management means for managing each of said areas decides a reliability of an area from which the agent intends to move based on said first information, and accepts only the agent moving from a reliable area, when the agent intends to move to the area from another area.

2. The agent system according to claim 1, said system further comprising:

means for sequentially recording a history indicating which area the agent moved to, wherein said management means for managing each of said areas decides whether or not to accept the agent based on said history of the agent, said first information and a predetermined criterion, when the agent intends to move to the area from another area.

3. The agent system according to claim 1, said system further comprising:

second information indicating whether or not a planning is allowed for the agent in each of said areas, wherein said management means for managing the agent avoids the planning in an area where the planning is not allowed, by referring to the second information.

4. The agent system according to claim 1, wherein at least one of said first and second information is collectively preserved in one spot.

5. An information processing method in which an agent processes information while moving among a plurality of areas on a network, comprising the steps of:

providing first information indicating whether or not each of said areas on the network is reliable;

deciding a reliability of an area to which the agent intends to move based on said first information, and allowing the agent only to move to a reliable area, when the agent intends to move among said plurality of areas; and deciding a reliability of an area from which the agent intends to move based on said first information, and accepting only the agent moving from a reliable area in an area to which the agent intends to move, when the agent intends to move among said plurality of areas.

6. The information processing method according to claim 5, said method further comprising the steps of:

sequentially recording a history indicating which area the agent moved to; and deciding whether or not to accept the agent in an area to which the agent intends to move, based on said history of the agent, said first information and a predetermined criterion, when the agent intends to move among said plurality of areas.

7. The information processing method according to claim 5, said method further comprising:
providing second information indicating whether or not a planning is allowed for the agent in each of said areas; and
avoiding the planning in an area where the planning is not allowed, by referring to the second information.

8. An agent system in which an agent processes information while moving among a plurality of nodes on a network,
wherein each node comprises:
means for preserving at least one of information for restoring the agent before a move and information for restoring the agent after the move when the agent moves among the nodes; and
means for restoring the agent using the preserved information when the agent has disappeared due to trouble.

9. The agent system according to claim 8, wherein said restoring means restores the agent when the node is restarted.

10. The agent system according to claim 8, wherein said restoring means restores the agent in response to receipt of a request.

11. The agent system according to claim 8,
said system further comprising:
means for sequentially recording as a history which node the agent moved to;
means for confirming a state of the agent in the latest node which is recorded in the history;
means for confirming a node other than the latest node where the agent stayed before the stay in the latest node based on said history, when the agent has disappeared in the latest node; and
means for requesting the confirmed node to restore the agent.

12. An information processing method in which an agent processes information while moving among a plurality of nodes on a network, comprising g the steps of:
preserving at least one of information for restoring the agent before a move and information for restoring the agent after the move when the agent moves among the nodes; and
restoring the agent using the preserved information when the agent has disappeared due to trouble.

13. The information processing method according to claim 12,
said method further comprising the steps of:
sequentially recording as a history which node the agent moved to;
confirming a state of the agent in the latest node which is recorded in the history;
confirming a node other than the latest node where the agent stayed before the stay in the latest node based on said history, when the agent has disappeared in the latest node; and
requesting the confirmed node to restore the agent.

14. An agent system in which an agent processes information while moving among a plurality of areas on a network, comprising:

a management unit configured to manage the agent and each of said areas; and
first information indicating whether or not each of said areas on the network is reliable;
wherein said management unit of the agent decides a reliability of an area to which the agent intends to move based on said first information, and allows the agent only to move to a reliable area, when the agent intends to move among said areas; and
said management unit of said each area decides a reliability of an area from which the agent intends to move based on said first information, and accepts only the agent moving from a reliable area, when the agent intends to move to the area from another area.

15. The agent system according to claim 14,
said system further comprising:
a unit configured to sequentially record a history indicating which area the agent moved to,
wherein said management unit of said each area decides whether or not to accept the agent based on said history of the agent, said first information and a predetermined criterion, when the agent intends to move to the area from another area.

16. The agent system according to claim 14,
said system further comprising:
second information indicating whether or not a planning is allowed for the agent in each of said areas,
wherein said management unit of the agent avoids the planning in an area where the planning is not allowed, by referring to the second information.

17. The agent system according to claim 14, wherein at least one of said first and second information is collectively preserved in one spot.

18. An agent system in which an agent processes information while moving among a plurality of nodes on a network,
wherein each node comprises:
a unit configured to preserve at least one of information for restoring the agent before a move and information for restoring the agent after the move when the agent moves among the nodes; and
a unit configured to restore the agent using the preserved information when the agent has disappeared due to trouble.

19. The agent system according to claim 18, wherein said restoring unit restores the agent when the node is restarted.

20. The agent system according to claim 18, wherein said restoring unit restores the agent in response to receipt of a request.

21. The agent system according to claim 18,
said system further comprising:
a unit configured to sequentially record as a history which node the agent moved to;
a unit configured to confirm a state of the agent in the latest node which is recorded in the history;
a unit configured to confirm a node other than the latest node where the agent stayed before the stay in the latest node based on said history, when the agent has disappeared in the latest node; and
a unit configured to request the confirmed node to restore the agent.

* * * * *